US010348118B2

(12) United States Patent
Takatsu et al.

(10) Patent No.: US 10,348,118 B2
(45) Date of Patent: Jul. 9, 2019

(54) WIRELESS POWER TRANSFER SYSTEM AND OBJECT POWER SUPPLY DEVICE

(71) Applicant: IHI CORPORATION, Tokyo (JP)

(72) Inventors: Yuji Takatsu, Tokyo (JP); Susumu Tokura, Tokyo (JP); Akio Ueda, Tokyo (JP); Sho Hashizume, Tokyo (JP); Kei Akune, Tokyo (JP); Tooru Hayashi, Tokyo (JP)

(73) Assignee: IHI CORPORATION, Tokyo (JP)

(*) Notice: Subject to any disclaimer, the term of this patent is extended or adjusted under 35 U.S.C. 154(b) by 364 days.

(21) Appl. No.: 15/271,910

(22) Filed: Sep. 21, 2016

(65) Prior Publication Data
US 2017/0012459 A1 Jan. 12, 2017

Related U.S. Application Data

(63) Continuation of application No. PCT/JP2015/059224, filed on Mar. 25, 2015.

(30) Foreign Application Priority Data

Mar. 26, 2014 (JP) ................. 2014-064848

(51) Int. Cl.
H02J 7/00 (2006.01)
H02J 7/02 (2016.01)
H02J 50/10 (2016.01)
B60L 53/20 (2019.01)
(Continued)

(52) U.S. Cl.
CPC .............. *H02J 7/025* (2013.01); *B60L 53/12* (2019.02); *B60L 53/18* (2019.02); *B60L 53/20* (2019.02); *B60L 53/30* (2019.02); *B60L 53/34* (2019.02); *B60L 58/12* (2019.02); *H02J 7/0042* (2013.01); *H02J 50/10* (2016.02); *B60L 2210/30* (2013.01); *B60L 2250/16* (2013.01); *B60L 2270/147* (2013.01); *Y02T 10/7005* (2013.01); *Y02T 10/705* (2013.01); *Y02T 10/7044* (2013.01);
(Continued)

(58) Field of Classification Search
CPC ...................................... H02J 7/025
USPC ....................................... 320/108
See application file for complete search history.

(56) References Cited

U.S. PATENT DOCUMENTS 8,035,255 B2 10/2011 Kurs
8,106,539 B2 1/2012 Schatz
(Continued)

FOREIGN PATENT DOCUMENTS

CN 101673962 A 3/2010
CN 102301564 A 12/2011
(Continued)

*Primary Examiner* — Richard V Muralidar
(74) *Attorney, Agent, or Firm* — Volpe and Koenig, P.C.

(57) ABSTRACT

A wireless power transfer system includes: a power supply primary coil capable of performing wireless power transfer; and a power supply secondary coil capable of performing the wireless power transfer between the power supply primary coil and the power supply secondary coil. The power supply secondary coil contains a secondary coil wire for the wireless power transfer and forms a secondary outer shape having a projecting surface on at least a part of the secondary outer shape, and the power supply primary coil and the power supply secondary coil are capable of performing the wireless power transfer, with the projecting surface of the secondary outer shape directed to the power supply primary coil.

8 Claims, 13 Drawing Sheets

(51) Int. Cl.
*B60L 53/12* (2019.01)
*B60L 53/30* (2019.01)
*B60L 58/12* (2019.01)
*B60L 53/18* (2019.01)
*B60L 53/34* (2019.01)

(52) U.S. Cl.
CPC ........ *Y02T 10/7088* (2013.01); *Y02T 10/7241* (2013.01); *Y02T 90/121* (2013.01); *Y02T 90/122* (2013.01); *Y02T 90/127* (2013.01); *Y02T 90/14* (2013.01)

(56) References Cited

U.S. PATENT DOCUMENTS

2012/0104998 A1  5/2012  Takada
2012/0200151 A1  8/2012  Obayashi

FOREIGN PATENT DOCUMENTS

| | | | |
|---|---|---|---|
| CN | 202210703 | U | 5/2012 |
| EP | 0680057 | A2 | 11/1995 |
| EP | 0874378 | A2 | 10/1998 |
| EP | 2688182 | A2 | 1/2014 |
| JP | 2002-305121 | A | 10/2002 |
| JP | 2011-060260 | A | 3/2011 |
| JP | 2011-072115 | A | 4/2011 |
| JP | 2011-097814 | A | 5/2011 |
| JP | 2011-514801 | A | 5/2011 |
| JP | 2012-085472 | A | 4/2012 |
| JP | 2012-223027 | A | 11/2012 |
| JP | 2013-126344 | A | 6/2013 |
| JP | 2013126344 | * | 6/2013 |
| WO | 2009/116025 | A | 9/2009 |
| WO | 2011/135424 | A3 | 11/2011 |

* cited by examiner

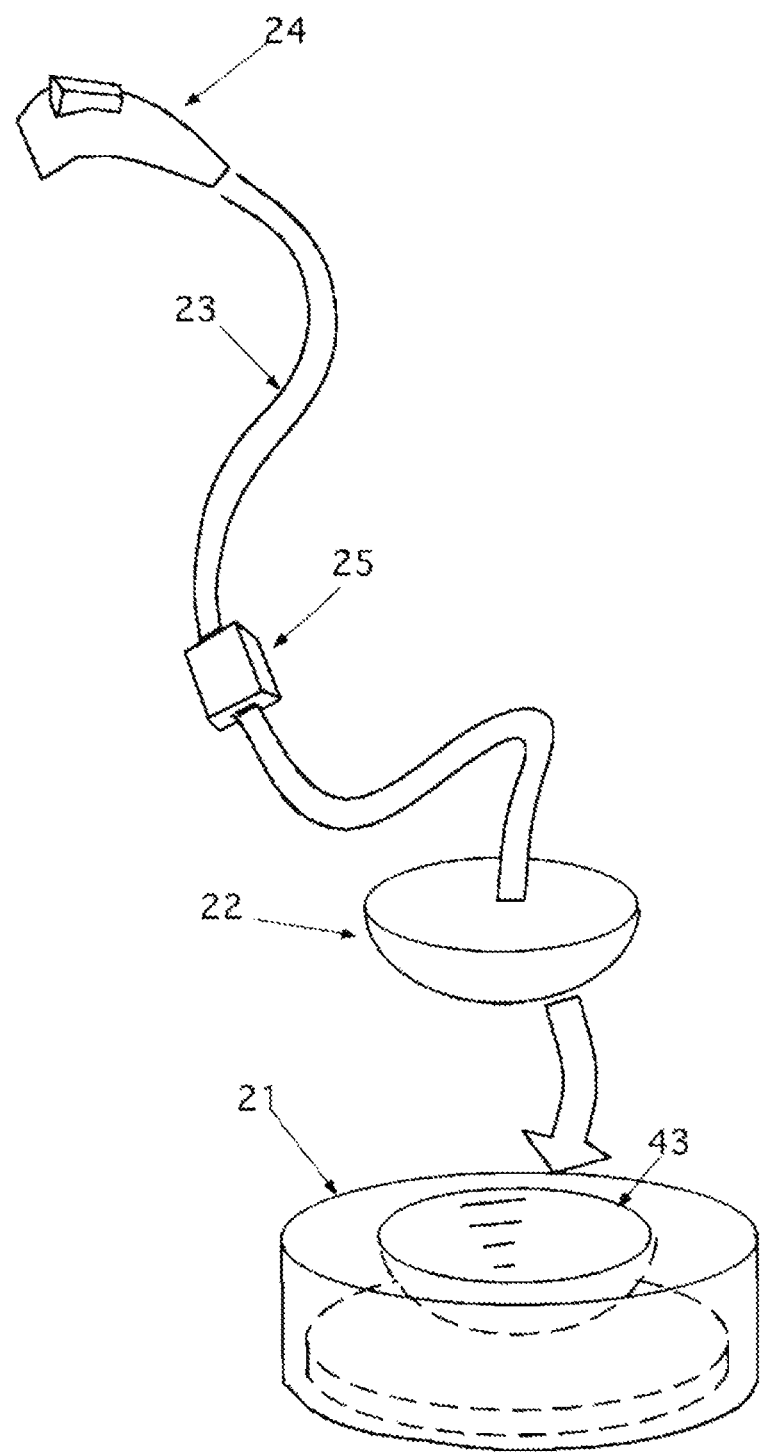

WIRELESS POWER TRANSFER SYSTEM AND OBJECT POWER SUPPLY DEVICE

CROSS-REFERENCE TO RELATED APPLICATIONS

This application is a continuation application of International Application No. PCT/JP2015/059224, filed Mar. 25, 2015, which claims priority to J Japanese Patent Application No. 2014-064848 filed Mar. 26, 2014. The contents of these applications are incorporated herein by reference in their entirety.

TECHNICAL FIELD

The present disclosure relates to a wireless power transfer system and an object power supply device that supplies electric power to an object capable of receiving power supply.

BACKGROUND ART

As an object that is driven by electric power, electric apparatuses, vehicles, moving bodies, and ships or the like are used.

It is necessary to supply electric power to an object.

A power supply apparatus is capable of supplying electric power to an object in a wireless manner.

FIGS. 13A and 13B are diagrams illustrating a concept of a wireless power transfer system.

The concept illustrated in FIGS. 13A and 13B has been disclosed in U.S. Pat. No. 8,035,255.

For example, electric power is supplied to a parked vehicle from a power supply apparatus.

For example, such an idea has been studied that a vehicle has a wireless type power supply secondary coil on a bottom part thereof, and a power supply primary coil is provided below the vehicle to supply electric power to the vehicle.

When a wireless type power transfer is employed, it is desired that the electric power is supplied with a small energy loss from the power supply primary coil to the power supply secondary coil.

When supplying electric power from the power supply primary coil to the power supply secondary coil in a wireless manner, it is also desired that usage is easy.

CITATION LIST

Patent Literature

Patent Literature 1: Japanese Unexamined Patent Publication No. 2011-60260
Patent Literature 2: Japanese Unexamined Patent Publication No. 2011-97814
Patent Literature 3: U.S. Pat. No. 8,035,255
Patent Literature 4: U.S. Pat. No. 8,106,539

SUMMARY

Technical Problem

The present disclosure describes an object power supply device capable of performing easily available power supply with a small energy loss using a simple structure.

Solution to Problem

In order to achieve the above-mentioned purpose, an aspect of the present disclosure is a wireless power transfer system that performs wireless power transfer, the wireless power transfer system including: a power supply primary coil capable of performing the wireless power transfer; and a power supply secondary coil capable of performing the wireless power transfer between the power supply primary coil and the power supply secondary coil, wherein the power supply secondary coil contains a secondary coil wire for the wireless power transfer and forms a secondary outer shape having a projecting surface on at least a part of the secondary outer shape, and the power supply primary coil and the power supply secondary coil are capable of performing the wireless power transfer, with the projecting surface of the secondary outer shape directed to the power supply primary coil.

Owing to the above-mentioned configuration, the power supply primary coil is capable of performing the wireless power transfer. The power supply secondary coil is capable of performing the wireless power transfer between the power supply primary coil and the power supply secondary coil. The power supply secondary coil contains the secondary coil wire for the wireless power transfer and forms the secondary outer shape having the projecting surface on at least a part of the secondary outer shape. The power supply primary coil and the power supply secondary coil are capable of performing the wireless power transfer, with the projecting surface of the secondary outer shape directed to the power supply primary coil.

As a result, the wireless power transfer can be performed, with a relative posture between the power supply primary coil and the power supply secondary coil set to a desired posture.

Hereinafter, a wireless power transfer system according to an embodiment of the present disclosure will be described. The present disclosure includes any of embodiments described below or an aspect that combines two or more of these embodiments.

The wireless power transfer system according to the embodiment of the present disclosure is configured such that the secondary outer shape has a projecting curved surface on at least a part of the secondary outer shape, and the power supply primary coil and the power supply secondary coil are capable of performing the wireless power transfer, with the projecting curved surface of the secondary outer shape directed to the power supply primary coil.

Owing to the above-mentioned configuration of the embodiment, the secondary outer shape has the projecting curved surface on at least a part of the secondary outer shape. The power supply primary coil and the power supply secondary coil are capable of performing the wireless power transfer, with the projecting curved surface of the secondary outer shape directed to the power supply primary coil.

As a result, the wireless power transfer can be performed, with the relative posture between the power supply primary coil and the power supply secondary coil set to the desired posture.

The wireless power transfer system according to the embodiment of the present disclosure is configured such that the secondary outer shape has a projecting curved surface on at least a part of the secondary outer shape, and a gravity center point of the power supply secondary coil is offset from a curvature center of the projecting curved surface and located on a side of the projecting curved surface.

Owing to the above-mentioned configuration of the embodiment, the secondary outer shape has the projecting curved surface on at least a part of the secondary outer shape.

The gravity center point of the power supply secondary coil is offset from the curvature center of the projecting curved surface and located on the side of the projecting curved surface.

As a result, the wireless power transfer can be performed, with a relative posture between the power supply primary coil and the power supply secondary coil set to a desired posture.

The wireless power transfer system according to the embodiment of the present disclosure is configured such that the power supply primary coil contains a primary coil wire for the wireless power transfer and forms a primary outer shape having a depression in at least a part of the primary outer shape, and the power supply primary coil and the power supply secondary coil are capable of performing the wireless power transfer, with the projecting surface of the secondary outer shape fit into the depression of the primary outer shape.

Owing to the above-mentioned configuration of the embodiment, the power supply primary coil contains the primary coil wire for the wireless power transfer and forms the primary outer shape having the depression in at least a part of the primary outer shape. The power supply primary coil and the power supply secondary coil are capable of performing the wireless power transfer, with the projecting surface of the secondary outer shape fit into the depression of the primary outer shape.

As a result, the wireless power transfer can be performed, with a relative posture between the power supply primary coil and the power supply secondary coil set to a desired posture.

The wireless power transfer system according to the embodiment of the present disclosure is configured such that the power supply primary coil contains a primary coil wire for the wireless power transfer and forms a primary outer shape having a depression in at least a part of the primary outer shape, the depression includes a first depression and a second depression located at a center of the first depression and smaller than the first depression, and the power supply primary coil and the power supply secondary coil are capable of performing the wireless power transfer, with the projecting surface of the secondary outer shape fit into the second depression of the primary outer shape.

Owing to the above-mentioned configuration of the embodiment, the power supply primary coil contains the primary coil wire for the wireless power transfer and forms the primary outer shape having the depression in at least a part of the primary outer shape. The depression includes the first depression and the second depression located at the center of the first depression and smaller than the first depression. The power supply primary coil and the power supply secondary coil are capable of performing the wireless power transfer, with the projecting surface of the secondary outer shape fit into the second depression of the primary outer shape.

As a result, the wireless power transfer can be performed, with a relative posture between the power supply primary coil and the power supply secondary coil set to a desired posture.

The wireless power transfer system according to the embodiment of the present disclosure includes an intermediate case that supports the power supply secondary coil, wherein the secondary outer shape has a projecting curved surface with a constant radius of curvature on at least a part of the secondary outer shape, the intermediate case has an inner wall forming a recessed curved surface with a constant radius of curvature that covers the projecting curved surface of the secondary outer shape, and the power supply primary coil and the power supply secondary coil are capable of performing the wireless power transfer, with the projecting curved surface of the secondary outer shape guided by the recessed curved surface of the intermediate case and swingable.

Owing to the above-mentioned configuration of the embodiment, the intermediate case supports the power supply secondary coil. The secondary outer shape has the projecting curved surface with the constant radius of curvature on at least a part of the secondary outer shape. The intermediate case has the inner wall forming the recessed curved surface with the constant radius of curvature that covers the projecting curved surface of the secondary outer shape. The power supply primary coil and the power supply secondary coil are capable of performing the wireless power transfer, with the projecting curved surface of the secondary outer shape guided by the recessed curved surface of the intermediate case and swingable.

As a result, the wireless power transfer can be performed, with a relative posture between the power supply primary coil and the power supply secondary coil set to a desired posture.

The wireless power transfer system according to the embodiment of the present disclosure includes an intermediate case that supports the power supply secondary coil, wherein the secondary outer shape has a projecting curved surface with a constant radius of curvature on at least a part of the secondary outer shape, the intermediate case has an inner wall forming a recessed curved surface with a constant radius of curvature that covers the projecting curved surface of the secondary outer shape, the intermediate case contains an intermediate coil wire, and the power supply primary coil and the power supply secondary coil are capable of performing the wireless power transfer relayed by the intermediate coil wire, with the projecting curved surface of the secondary outer shape guided by the recessed curved surface of the intermediate case and swingable.

Owing to the above-mentioned configuration of the embodiment, the intermediate case supports the power supply secondary coil. The secondary outer shape has the projecting curved surface with the constant radius of curvature on at least a part of the secondary outer shape. The intermediate case has the inner wall forming the recessed curved surface with the constant radius of curvature that covers the projecting curved surface of the secondary outer shape. The intermediate case contains the intermediate coil wire. The power supply primary coil and the power supply secondary coil are capable of performing the wireless power transfer relayed by the intermediate coil wire, with the projecting curved surface of the secondary outer shape guided by the recessed curved surface of the intermediate case and swingable.

As a result, the wireless power transfer can be performed, with a relative posture between the power supply primary coil and the power supply secondary coil set to a desired posture.

The wireless power transfer system according to the embodiment of the present disclosure is configured such that the power supply secondary coil contains a first secondary coil wire and a second secondary coil wire that are a pair of secondary coil wires, the first secondary coil wire is wound along a first virtual surface, the second secondary coil wire is wound along a second virtual surface, and the first virtual surface and the second virtual surface intersect.

Owing to the above-mentioned configuration of the embodiment, the power supply secondary coil contains the first secondary coil wire and the second secondary coil wire that are the pair of secondary coil wires. The first secondary coil wire is wound along the first virtual surface. The second secondary coil wire is wound along the second virtual surface. The first virtual surface and the second virtual surface intersect.

As a result, the wireless power transfer can be performed, with a relative posture between the power supply primary coil and the power supply secondary coil set to a desired posture.

In order to achieve the above-mentioned purpose, an aspect of the present disclosure is an object power supply device capable of supplying electric power to an object in which a power receiving circuit is provided, the object power supply device including: a power supply primary coil provided at a storage space capable of storing the object, and capable of performing wireless power transfer to a power supply secondary coil; and a charging cable having an electric circuit that is electrically connectable to the power receiving circuit of the object, and the power supply secondary coil electrically connected to the electric circuit and capable of receiving the wireless power transfer from the power supply primary coil, wherein the power supply secondary coil contains a secondary coil wire for the wireless power transfer and forms a secondary outer shape having a projecting surface on at least a part of the secondary outer shape, and the power supply primary coil and the power supply secondary coil are capable of performing the wireless power transfer, with the projecting surface of the secondary outer shape directed to the power supply primary coil.

Owing to the above-mentioned configuration, the power supply primary coil is provided at the storage space capable of storing the object, and capable of performing the wireless power transfer to the power supply secondary coil. The charging cable has the electric circuit that is electrically connectable to the power receiving circuit of the object, and the power supply secondary coil electrically connected to the electric circuit and capable of receiving the wireless power transfer from the power supply primary coil. The power supply secondary coil contains the secondary coil wire for the wireless power transfer and forms the secondary outer shape having the projecting surface on at least a part of the secondary outer shape. The power supply primary coil and the power supply secondary coil are capable of performing the wireless power transfer, with the projecting surface of the secondary outer shape directed to the power supply primary coil.

As a result, the wireless power transfer can be performed, with a relative posture between the power supply primary coil and the power supply secondary coil set to a desired posture.

Hereinafter, an object power supply device according to an embodiment of the present disclosure will be described. The present disclosure includes any of embodiments described below or an aspect that combines two or more of these embodiments.

The object power supply device according to the embodiment of the present disclosure is configured such that the secondary outer shape has a projecting curved surface on at least a part of the secondary outer shape, and the power supply primary coil and the power supply secondary coil are capable of performing the wireless power transfer, with the projecting curved surface of the secondary outer shape directed to the power supply primary coil.

Owing to the above-mentioned configuration of the embodiment, the secondary outer shape has the projecting curved surface on at least a part of the secondary outer shape. The power supply primary coil and the power supply secondary coil are capable of performing the wireless power transfer, with the projecting curved surface of the secondary outer shape directed to the power supply primary coil.

As a result, the wireless power transfer can be performed, with a relative posture between the power supply primary coil and the power supply secondary coil set to a desired posture.

The object power supply device according to the embodiment of the present disclosure is configured such that a gravity center point of the power supply secondary coil is offset from a curvature center of the projecting curved surface and located on a side of the projecting curved surface.

Owing to the above-mentioned configuration of the embodiment, the gravity center point of the power supply secondary coil is offset from the curvature center of the projecting curved surface and located on the side of the projecting curved surface.

As a result, the wireless power transfer can be performed, with a relative posture between the power supply primary coil and the power supply secondary coil set to a desired posture.

The object power supply device according to the embodiment of the present disclosure is configured such that the storage space forms a primary outer shape having a depression in at least a part of a position where the power supply primary coil is provided, and the power supply primary coil and the power supply secondary coil are capable of performing the wireless power transfer, with the projecting surface of the secondary outer shape fit into the depression of the primary outer shape.

Owing to the above-mentioned configuration of the embodiment, the storage space forms the primary outer shape having the depression in at least a part of the position where the power supply primary coil is provided. The power supply primary coil and the power supply secondary coil are capable of performing the wireless power transfer, with the projecting surface of the secondary outer shape fit into the depression of the primary outer shape.

As a result, the wireless power transfer can be performed, with a relative posture between the power supply primary coil and the power supply secondary coil set to a desired posture.

The object power supply device according to the embodiment of the present disclosure is configured such the storage space forms a primary outer shape having a depression in at least a part of a position where the power supply primary coil is provided, the depression includes a first depression and a second depression located at a center of the first depression and smaller than the first depression, and the power supply primary coil and the power supply secondary coil are capable of performing the wireless power transfer, with the projecting surface of the secondary outer shape fit into the second depression of the primary outer shape.

Owing to the above-mentioned configuration of the embodiment, the storage space forms the primary outer shape having the depression in at least a part of the position where the power supply primary coil is provided. The depression includes the first depression and the second depression located at the center of the first depression and smaller than the first depression. The power supply primary coil and the power supply secondary coil are capable of performing the wireless power transfer, with the projecting surface of the secondary outer shape fit into the second depression of the primary outer shape.

As a result, the wireless power transfer can be performed, with a relative posture between the power supply primary coil and the power supply secondary coil set to a desired posture.

The object power supply device according to the embodiment of the present disclosure includes an intermediate case that supports the power supply secondary coil, wherein the secondary outer shape has a projecting curved surface with a constant radius of curvature on at least a part of the secondary outer shape, the intermediate case has an inner wall forming a recessed curved surface with a constant radius of curvature that covers the curved surface of the secondary outer shape, and the power supply primary coil and the power supply secondary coil are capable of performing the wireless power transfer, with the projecting curved surface of the secondary outer shape guided by the recessed curved surface of the intermediate case and swingable.

Owing to the above-mentioned configuration of the embodiment, the intermediate case supports the power supply secondary coil. The secondary outer shape has the projecting curved surface with the constant radius of curvature on at least a part of the secondary outer shape. The intermediate case has the inner wall forming the recessed curved surface with the constant radius of curvature that covers the curved surface of the secondary outer shape. The power supply primary coil and the power supply secondary coil are capable of performing the wireless power transfer, with the projecting curved surface of the secondary outer shape guided by the recessed curved surface of the intermediate case and swingable.

As a result, the wireless power transfer can be performed, with a relative posture between the power supply primary coil and the power supply secondary coil set to a desired posture.

The object power supply device according to the embodiment of the present disclosure includes an intermediate case that supports the power supply secondary coil, wherein the secondary outer shape has a projecting curved surface with a constant radius of curvature on at least a part of the secondary outer shape, the intermediate case has an inner wall forming a recessed curved surface with a constant radius of curvature that covers the projecting curved surface of the secondary outer shape, the intermediate case contains an intermediate coil wire, and the power supply primary coil and the power supply secondary coil are capable of performing the wireless power transfer relayed by the intermediate coil wire, with the projecting curved surface of the secondary outer shape guided by the recessed curved surface of the intermediate case and swingable.

Owing to the above-mentioned configuration of the embodiment, the intermediate case supports the power supply secondary coil. The secondary outer shape has the projecting curved surface with the constant radius of curvature on at least a part of the secondary outer shape. The intermediate case has the inner wall forming the recessed curved surface with the constant radius of curvature that covers the projecting curved surface of the secondary outer shape. The intermediate case contains the intermediate coil wire. The power supply primary coil and the power supply secondary coil are capable of performing the wireless power transfer relayed by the intermediate coil wire, with the projecting curved surface of the secondary outer shape guided by the recessed curved surface of the intermediate case and swingable.

As a result, the wireless power transfer can be performed, with a relative posture between the power supply primary coil and the power supply secondary coil set to a desired posture.

The object power supply device according to the embodiment of the present disclosure is configured such that the power supply secondary coil contains a first secondary coil wire and a second secondary coil wire that are a pair of secondary coil wires, the first secondary coil wire is wound along a first virtual surface, the second secondary coil wire is wound along a second virtual surface, and the first virtual surface and the second virtual surface intersect.

Owing to the above-mentioned configuration of the embodiment, the power supply secondary coil contains the first secondary coil wire and the second secondary coil wire that are the pair of secondary coil wires. The first secondary coil wire is wound along the first virtual surface. The second secondary coil wire is wound along the second virtual surface. The first virtual surface and the second virtual surface intersect. As a result, the wireless power transfer can be performed, with a relative posture between the power supply primary coil and the power supply secondary coil set to a desired posture.

In order to achieve the above-mentioned purpose, an aspect of the present disclosure is an object power supply device capable of supplying electric power to an object in which a power receiving circuit is provided, the object power supply device including: an object support structure capable of supporting the object; a power supply primary coil provided at the object support structure and capable of performing wireless power transfer to the power supply secondary coil; and a charging cable having an electric circuit that is electrically connectable to the power receiving circuit of the object, and the power supply secondary coil electrically connected to the electric circuit and capable of receiving the wireless power transfer from the power supply primary coil, wherein the power supply secondary coil contains a secondary coil wire for the wireless power transfer and forms a secondary outer shape having a projecting surface on at least a part of the secondary outer shape, and the power supply primary coil and the power supply secondary coil are capable of performing the wireless power transfer, with the projecting surface of the secondary outer shape directed to the power supply primary coil.

Owing to the above-mentioned configuration, the object support structure is capable of supporting the object. The power supply primary coil is provided at the object support structure and capable of performing the wireless power transfer to the power supply secondary coil. The charging cable has the electric circuit that is electrically connectable to the power receiving circuit of the object, and the power supply secondary coil electrically connected to the electric circuit and capable of receiving the wireless power transfer from the power supply primary coil. The power supply secondary coil contains the secondary coil wire for the wireless power transfer and forms the secondary outer shape having the projecting surface on at least a part of the secondary outer shape. The power supply primary coil and the power supply secondary coil are capable of performing the wireless power transfer, with the projecting surface of the secondary outer shape directed to the power supply primary coil.

As a result, the wireless power transfer can be performed, with a relative posture between the power supply primary coil and the power supply secondary coil set to a desired posture.

Hereinafter, an object power supply device according to an embodiment of the present disclosure will be described. The present disclosure includes any of embodiments described below or an aspect that combines two or more of these embodiments.

The object power supply device according to the embodiment of the present disclosure is configured such that the secondary outer shape has a projecting curved surface on at least a part of the secondary outer shape, and the power supply primary coil and the power supply secondary coil are capable of performing the wireless power transfer, with the projecting curved surface of the secondary outer shape directed to the power supply primary coil.

Owing to the above-mentioned configuration of the embodiment, the secondary outer shape has an outer shape forming the projecting curved surface on at least a part of the outer shape. The power supply primary coil and the power supply secondary coil are capable of performing the wireless power transfer, with the projecting curved surface of the secondary outer shape directed to the power supply primary coil.

As a result, the wireless power transfer can be performed, with a relative posture between the power supply primary coil and the power supply secondary coil set to a desired posture.

The object power supply device according to the embodiment of the present disclosure is configured such that a gravity center point of the power supply secondary coil is offset from a curvature center of the projecting curved surface and located on a side of the projecting curved surface.

Owing to the above-mentioned configuration of the embodiment, the gravity center point of the power supply secondary coil is offset from the curvature center of the projecting curved surface and located on the side of the projecting curved surface.

As a result, the wireless power transfer can be performed, with a relative posture between the power supply primary coil and the power supply secondary coil set to a desired posture.

The object power supply device according to the embodiment of the present disclosure is configured such that the object support structure forms a primary outer shape having a depression in at least a part of a position where the power supply primary coil is provided, and the power supply primary coil and the power supply secondary coil are capable of performing the wireless power transfer, with the projecting surface of the secondary outer shape fit into the depression of the primary outer shape.

Owing to the above-mentioned configuration of the embodiment, the object support structure forms the primary outer shape having the depression in at least a part of the position where the power supply primary coil is provided. The power supply primary coil and the power supply secondary coil are capable of performing the wireless power transfer, with the projecting surface of the secondary outer shape fit into the depression of the primary outer shape.

As a result, the wireless power transfer can be performed, with a relative posture between the power supply primary coil and the power supply secondary coil set to a desired posture.

The object power supply device according to the embodiment of the present disclosure is configured such the object support structure forms a primary outer shape having a depression in at least a part of a position where the power supply primary coil is provided, the depression includes a first depression and a second depression located at a center of the first depression and smaller than the first depression, and the power supply primary coil and the power supply secondary coil are capable of performing the wireless power transfer, with the projecting surface of the secondary outer shape fit into the second depression of the primary outer shape.

Owing to the above-mentioned configuration of the embodiment, the object support structure forms the primary outer shape having the depression in at least a part of the position where the power supply primary coil is provided. The depression includes the first depression and the second depression located at the center of the first depression and smaller than the first depression. The power supply primary coil and the power supply secondary coil are capable of performing the wireless power transfer, with the projecting surface of the secondary outer shape fit into the second depression of the primary outer shape.

As a result, the wireless power transfer can be performed, with a relative posture between the power supply primary coil and the power supply secondary coil set to a desired posture.

The object power supply device according to the embodiment of the present disclosure includes an intermediate case that supports the power supply secondary coil, wherein the secondary outer shape has a projecting curved surface with a constant radius of curvature on at least a part of the secondary outer shape, the intermediate case has an inner wall forming a recessed curved surface with a constant radius of curvature that covers the curved surface of the secondary outer shape, and the power supply primary coil and the power supply secondary coil are capable of performing the wireless power transfer, with the projecting curved surface of the secondary outer shape guided by the recessed curved surface of the intermediate case and swingable.

Owing to the above-mentioned configuration of the embodiment, the intermediate case supports the power supply secondary coil. The secondary outer shape has the projecting curved surface with the constant radius of curvature on at least a part of the secondary outer shape. The intermediate case has the inner wall forming the recessed curved surface with the constant radius of curvature that covers the curved surface of the secondary outer shape. The power supply primary coil and the power supply secondary coil are capable of performing the wireless power transfer, with the projecting curved surface of the secondary outer shape guided by the recessed curved surface of the intermediate case and swingable.

As a result, the wireless power transfer can be performed, with a relative posture between the power supply primary coil and the power supply secondary coil set to a desired posture.

The object power supply device according to the embodiment of the present disclosure includes an intermediate case that supports the power supply secondary coil, wherein the secondary outer shape has a projecting curved surface with a constant radius of curvature on at least a part of the secondary outer shape, the intermediate case has an inner wall forming a recessed curved surface with a constant radius of curvature that covers the projecting curved surface of the secondary outer shape, the intermediate case contains an intermediate coil wire, and the power supply primary coil and the power supply secondary coil are capable of performing the wireless power transfer relayed by the intermediate coil wire, with the projecting curved surface of the secondary outer shape guided by the recessed curved surface of the intermediate case and swingable.

Owing to the above-mentioned configuration of the embodiment, the intermediate case supports the power supply secondary coil. The secondary outer shape has the projecting curved surface with the constant radius of curvature on at least a part of the secondary outer shape. The intermediate case has the inner wall forming the recessed curved surface with the constant radius of curvature that covers the projecting curved surface of the secondary outer shape. The intermediate case contains the intermediate coil wire. The power supply primary coil and the power supply secondary coil are capable of performing the wireless power transfer relayed by the intermediate coil wire, with the projecting curved surface of the secondary outer shape guided by the recessed curved surface of the intermediate case and swingable.

As a result, the wireless power transfer can be performed, with a relative posture between the power supply primary coil and the power supply secondary coil set to a desired posture.

The object power supply device according to the embodiment of the present disclosure is configured such that the power supply secondary coil contains a first secondary coil wire and a second secondary coil wire that are a pair of secondary coil wires, the first secondary coil wire is wound along a first virtual surface, the second secondary coil wire is wound along a second virtual surface, and the first virtual surface and the second virtual surface intersect.

Owing to the above-mentioned configuration of the embodiment, the power supply secondary coil contains the first secondary coil wire and the second secondary coil wire that are the pair of secondary coil wires. The first secondary coil wire is wound along the first virtual surface. The second secondary coil wire is wound along the second virtual surface. The first virtual surface and the second virtual surface intersect.

As a result, the wireless power transfer can be performed, with a relative posture between the power supply primary coil and the power supply secondary coil set to a desired posture.

Effects of Disclosure

As described above, the wireless power transfer system according to an aspect of the present disclosure has the following effects owing to its configuration.

The wireless power transfer is performed, with the projecting surface formed on a part of the power supply secondary coil containing the secondary coil wire for the wireless power transfer directed to the power supply primary coil. Therefore, the wireless power transfer can be performed, with the relative posture between the power supply primary coil and the power supply secondary coil set to the desired posture.

The wireless power transfer is performed, with the projecting curved surface formed on a part of the power supply secondary coil containing the secondary coil wire for the wireless power transfer directed to the power supply primary coil. Therefore, the wireless power transfer can be performed, with the relative posture between the power supply primary coil and the power supply secondary coil set to the desired posture.

The wireless power transfer is performed, with the gravity center point of the power supply secondary coil offset from the curvature center of the curved surface and located on the side of the curved surface, and with the projecting curved surface formed on a part of the power supply secondary coil containing the secondary coil wire for the wireless power transfer directed to the power supply primary coil. Therefore, the wireless power transfer can be performed, with the relative posture between the power supply primary coil and the power supply secondary coil set to the desired posture.

The wireless power transfer is performed, with the projecting surface formed on a part of the power supply secondary coil containing the secondary coil wire for the wireless power transfer directed to the power supply primary coil and fit into the depression of the power supply primary coil. Therefore, the wireless power transfer can be performed, with the relative posture between the power supply primary coil and the power supply secondary coil set to the desired posture.

The wireless power transfer is performed, with the projecting surface formed on a part of the power supply secondary coil containing the secondary coil wire for the wireless power transfer directed to the power supply primary coil and fit into the second depression located at the center of the first depression of the power supply primary coil. Therefore, the wireless power transfer can be performed, with the relative posture between the power supply primary coil and the power supply secondary coil set to the desired posture.

The wireless power transfer is performed, with the projecting curved surface with the constant radius of curvature formed on a part of the power supply secondary coil containing the secondary coil wire for the wireless power transfer covered by the intermediate case, and with the curved surface directed to the power supply primary coil. Therefore, the wireless power transfer can be performed, with the relative posture between the power supply primary coil and the power supply secondary coil set to the desired posture.

The wireless power transfer is performed, with the intermediate case containing the intermediate coil wire covering the projecting curved surface with the constant radius of curvature formed on a part of the power supply secondary coil containing the secondary coil wire for the wireless power transfer, and with the curved surface directed to the power supply primary coil. Therefore, the wireless power transfer can be performed, with the relative posture between the power supply primary coil and the power supply secondary coil set to the desired posture.

The wireless power transfer is performed, with the projecting surface formed on a part of the power supply secondary coil containing the first secondary coil wire and the second secondary coil respectively wound along the intersecting first virtual surface and second virtual surface directed to the power supply primary coil. Therefore, the wireless power transfer can be performed, with the relative posture between the power supply primary coil and the power supply secondary coil set to the desired posture.

As described above, the object power supply device according to an aspect of the present disclosure has the following effects owing to its configuration.

The wireless power transfer is performed, with the projecting surface formed on a part of the power supply secondary coil containing the secondary coil wire for the wireless power transfer directed to the power supply primary coil provided at the storage space. Therefore, the wireless power transfer can be performed, with the relative posture between the power supply primary coil and the power supply secondary coil set to the desired posture.

The wireless power transfer is performed, with the projecting curved surface formed on a part of the power supply secondary coil containing the secondary coil wire for the wireless power transfer directed to the power supply primary coil provided at the storage space. Therefore, the wireless power transfer can be performed, with the relative posture between the power supply primary coil and the power supply secondary coil set to the desired posture.

The wireless power transfer is performed, with the gravity center point of the power supply secondary coil offset from the curvature center of the curved surface and located on the side of the curved surface, and with the projecting curved surface formed on a part of the power supply secondary coil containing the secondary coil wire for the wireless power transfer directed to the power supply primary coil provided at the storage space. Therefore, the wireless power transfer can be performed, with the relative posture between the power supply primary coil and the power supply secondary coil set to the desired posture.

The wireless power transfer is performed, with the projecting surface formed on a part of the power supply secondary coil containing the secondary coil wire for the wireless power transfer directed to the power supply primary coil provided at the storage space and fit into the depression of the storage space. Therefore, the wireless power transfer can be performed, with the relative posture between the power supply primary coil and the power supply secondary coil set to the desired posture.

The wireless power transfer is performed, with the projecting surface formed on a part of the power supply secondary coil containing the secondary coil wire for the wireless power transfer directed to the power supply primary coil provided at the storage space and fit into the second depression located at the center of the first depression of the storage space. Therefore, the wireless power transfer can be performed, with the relative posture between the power supply primary coil and the power supply secondary coil set to the desired posture.

The wireless power transfer is performed, with the projecting curved surface with the constant radius of curvature formed on a part of the power supply secondary coil containing the secondary coil wire for the wireless power transfer covered by the intermediate case, and with the curved surface directed to the power supply primary coil provided at the storage space. Therefore, the wireless power transfer can be performed, with the relative posture between the power supply primary coil and the power supply secondary coil set to the desired posture.

The wireless power transfer is performed, with the intermediate case containing the intermediate coil wire covering the projecting curved surface with the constant radius of curvature formed on a part of the power supply secondary coil containing the secondary coil wire for the wireless power transfer, and with the curved surface directed to the power supply primary coil. Therefore, the wireless power transfer can be performed, with the relative posture between the power supply primary coil and the power supply secondary coil set to the desired posture.

The wireless power transfer is performed, with the projecting surface formed on a part of the power supply secondary coil containing the first secondary coil wire and the second secondary coil respectively wound along the intersecting first virtual surface and second virtual surface directed to the power supply primary coil provided at the storage space. Therefore, the wireless power transfer can be performed, with the relative posture between the power supply primary coil and the power supply secondary coil set to the desired posture.

As described above, the object power supply device according to an aspect of the present disclosure has the following effects owing to its configuration.

The wireless power transfer is performed, with the projecting surface formed on a part of the power supply secondary coil containing the secondary coil wire for the wireless power transfer directed to the power supply primary coil provided at the object support structure. Therefore, the wireless power transfer can be performed, with the relative posture between the power supply primary coil and the power supply secondary coil set to the desired posture.

The wireless power transfer is performed, with the projecting curved surface formed on a part of the power supply secondary coil containing the secondary coil wire for the wireless power transfer directed to the power supply primary coil provided at the object support structure. Therefore, the wireless power transfer can be performed, with the relative posture between the power supply primary coil and the power supply secondary coil set to the desired posture.

The wireless power transfer is performed, with the gravity center point of the power supply secondary coil offset from the curvature center of the curved surface and located on the side of the curved surface, and with the projecting curved surface formed on a part of the power supply secondary coil containing the secondary coil wire for the wireless power transfer directed to the power supply primary coil provided at the object support structure. Therefore, the wireless power transfer can be performed, with the relative posture between the power supply primary coil and the power supply secondary coil set to the desired posture.

The wireless power transfer is performed, with the projecting surface formed on a part of the power supply secondary coil containing the secondary coil wire for the wireless power transfer directed to the power supply primary coil provided at the object support structure and fit into the depression of the object support structure. Therefore, the wireless power transfer can be performed, with the relative posture between the power supply primary coil and the power supply secondary coil set to the desired posture.

The wireless power transfer is performed, with the projecting surface formed on a part of the power supply secondary coil containing the secondary coil wire for the wireless power transfer directed to the power supply primary coil provided at the object support structure and fit into the second depression located at the center of the first depression of the object support structure. Therefore, the wireless power transfer can be performed, with the relative posture between the power supply primary coil and the power supply secondary coil set to the desired posture.

The wireless power transfer is performed, with the projecting curved surface with the constant radius of curvature formed on a part of the power supply secondary coil containing the secondary coil wire for the wireless power transfer covered by the intermediate case, and with the curved surface directed to the power supply primary coil provided at the object support structure. Therefore, the wireless power transfer can be performed, with the relative posture between the power supply primary coil and the power supply secondary coil set to the desired posture.

The wireless power transfer is performed, with the intermediate case containing the intermediate coil wire covering the projecting curved surface with the constant radius of curvature formed on a part of the power supply secondary coil containing the secondary coil wire for the wireless power transfer, and with the curved surface directed to the power supply primary coil. Therefore, the wireless power transfer can be performed, with the relative posture between the power supply primary coil and the power supply secondary coil set to the desired posture.

The wireless power transfer is performed, with the projecting surface formed on a part of the power supply secondary coil containing the first secondary coil wire and the second secondary coil respectively wound along the intersecting first virtual surface and second virtual surface directed to the power supply primary coil provided at the object support structure. Therefore, the wireless power transfer can be performed, with the relative posture between the power supply primary coil and the power supply secondary coil set to the desired posture.

Thus, it is possible to provide the wireless power transfer system and the object power supply device that are easily available with a small energy loss using a simple structure.

BRIEF DESCRIPTION OF DRAWINGS

FIG. 9 is a partial view of the object power supply device according to the first embodiment of the present disclosure.

DESCRIPTION OF EMBODIMENTS

To begin with, embodiments for practicing the present disclosure will be described with reference to the drawings.

Figure 1:
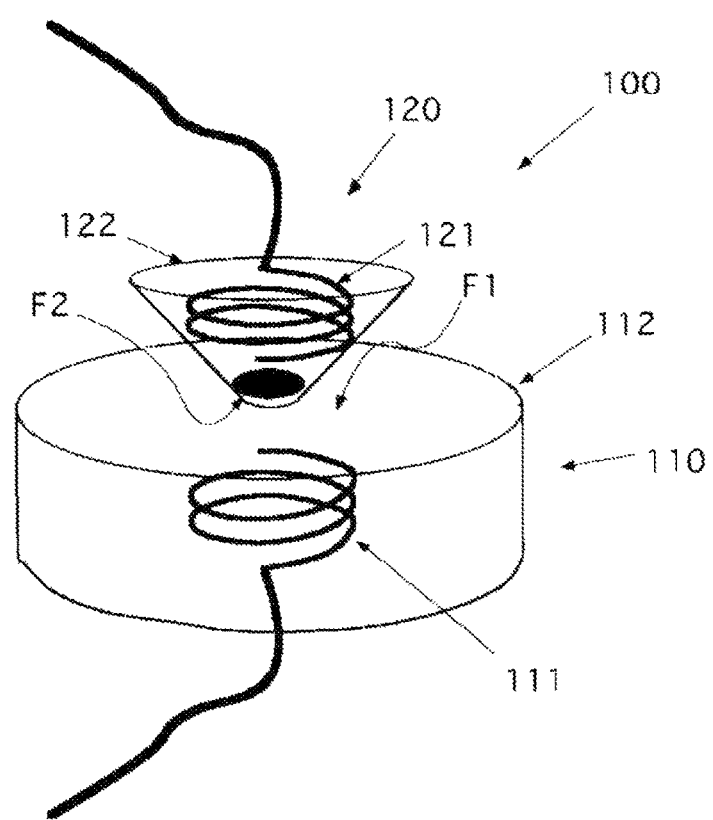
FIG. 1 is a diagram of a wireless power transfer system according to a first embodiment of the present disclosure.
Figure 2:
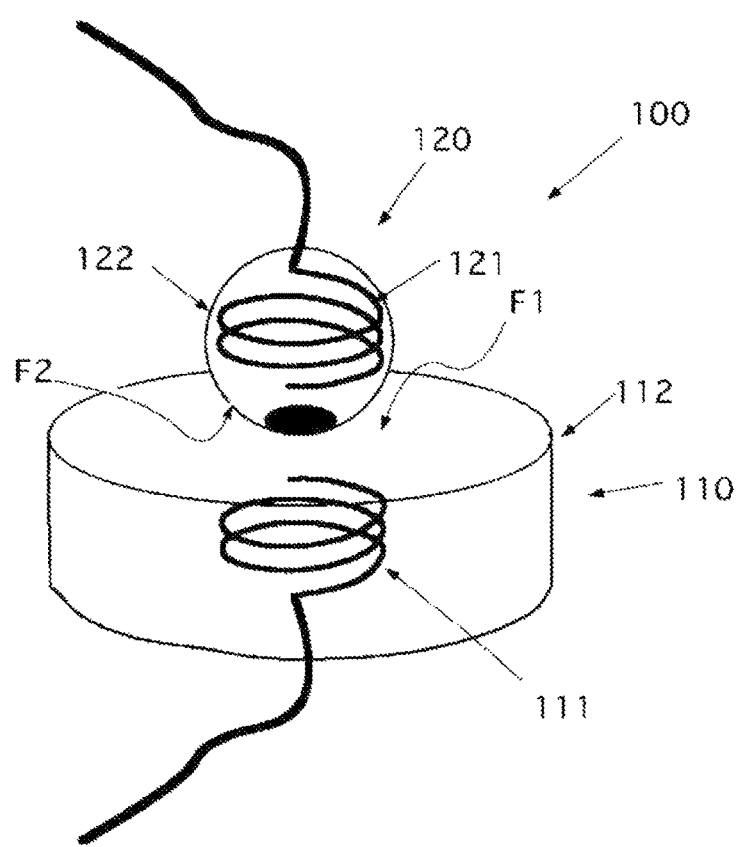
FIG. 2 is a diagram of a wireless power transfer system according to a second embodiment of the present disclosure.
Figure 3:
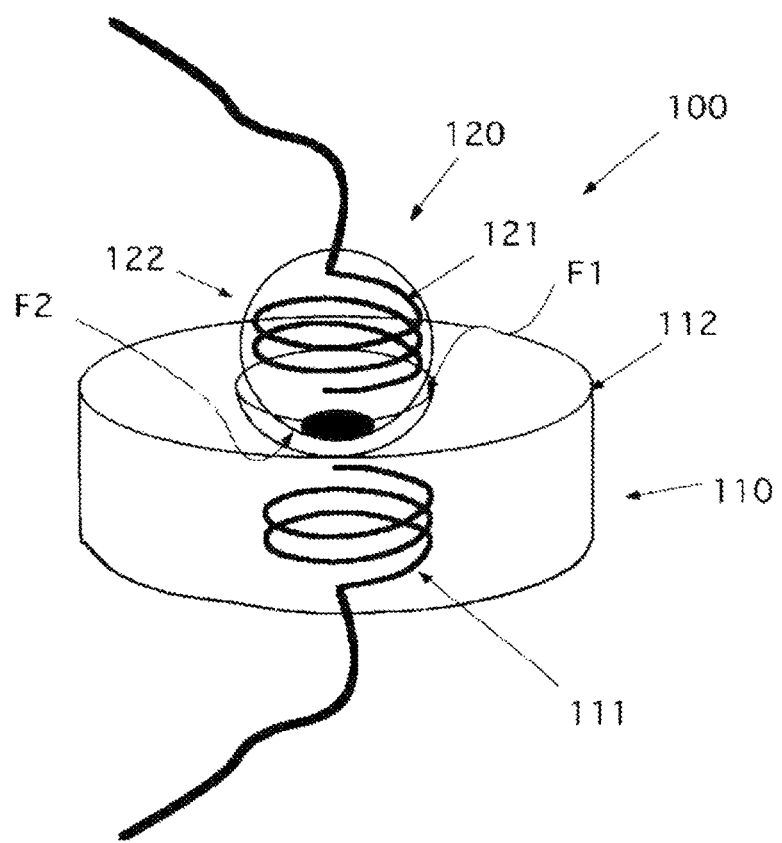
FIG. 3 is a diagram of a wireless power transfer system according to a third embodiment of the present disclosure.
Figure 4:
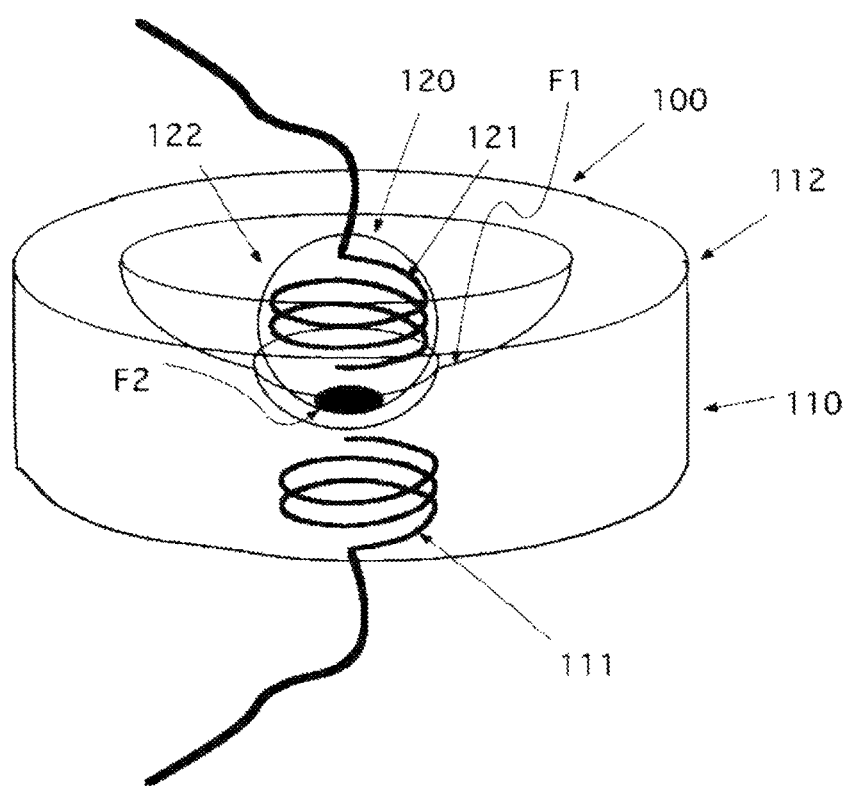
FIG. 4 is a diagram of a wireless power transfer system according to a fourth embodiment of the present disclosure.
Figure 5:
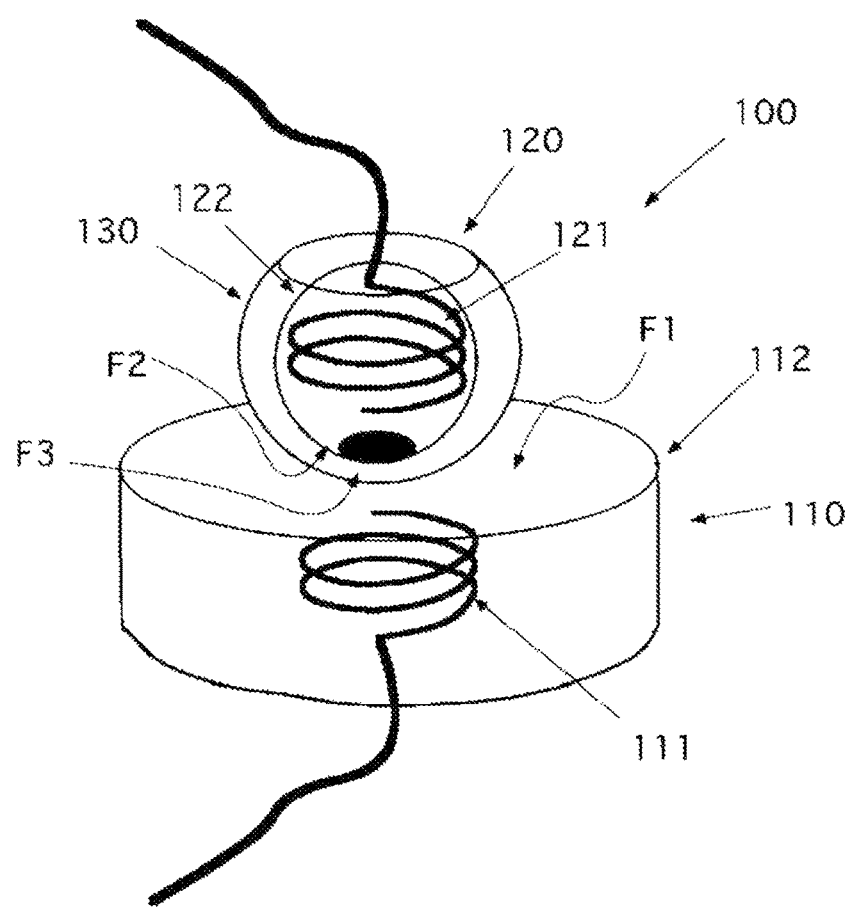
FIG. 5 is a diagram of a wireless power transfer system according to a fifth embodiment of the present disclosure.
Figure 6:
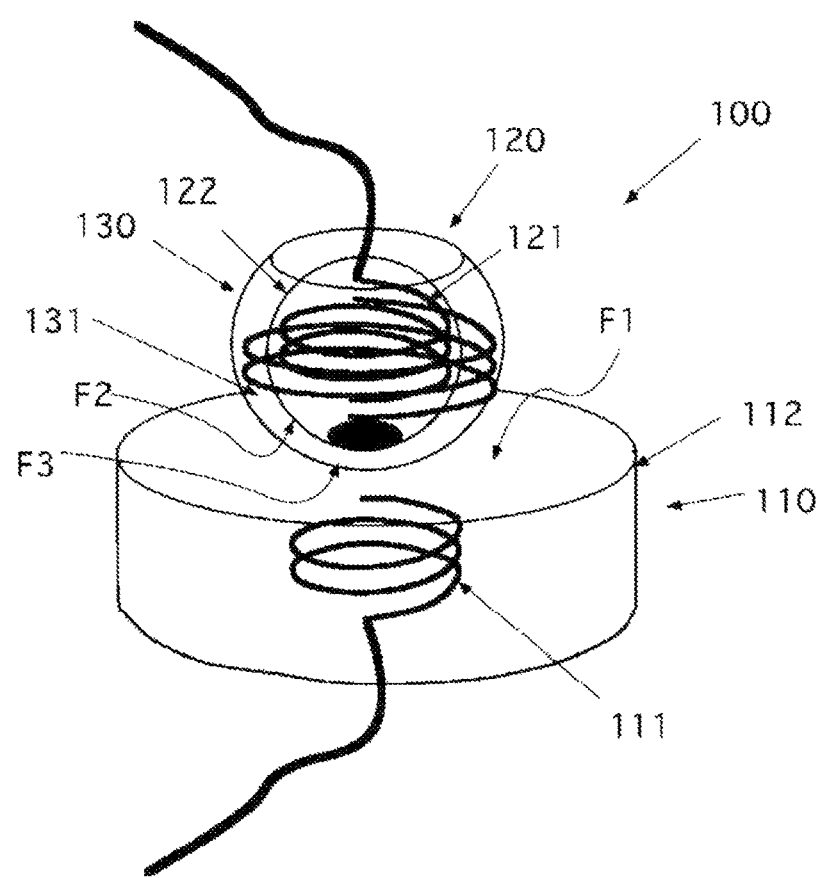
FIG. 6 is a diagram of a wireless power transfer system according to a sixth embodiment of the present disclosure.
Figure 7:
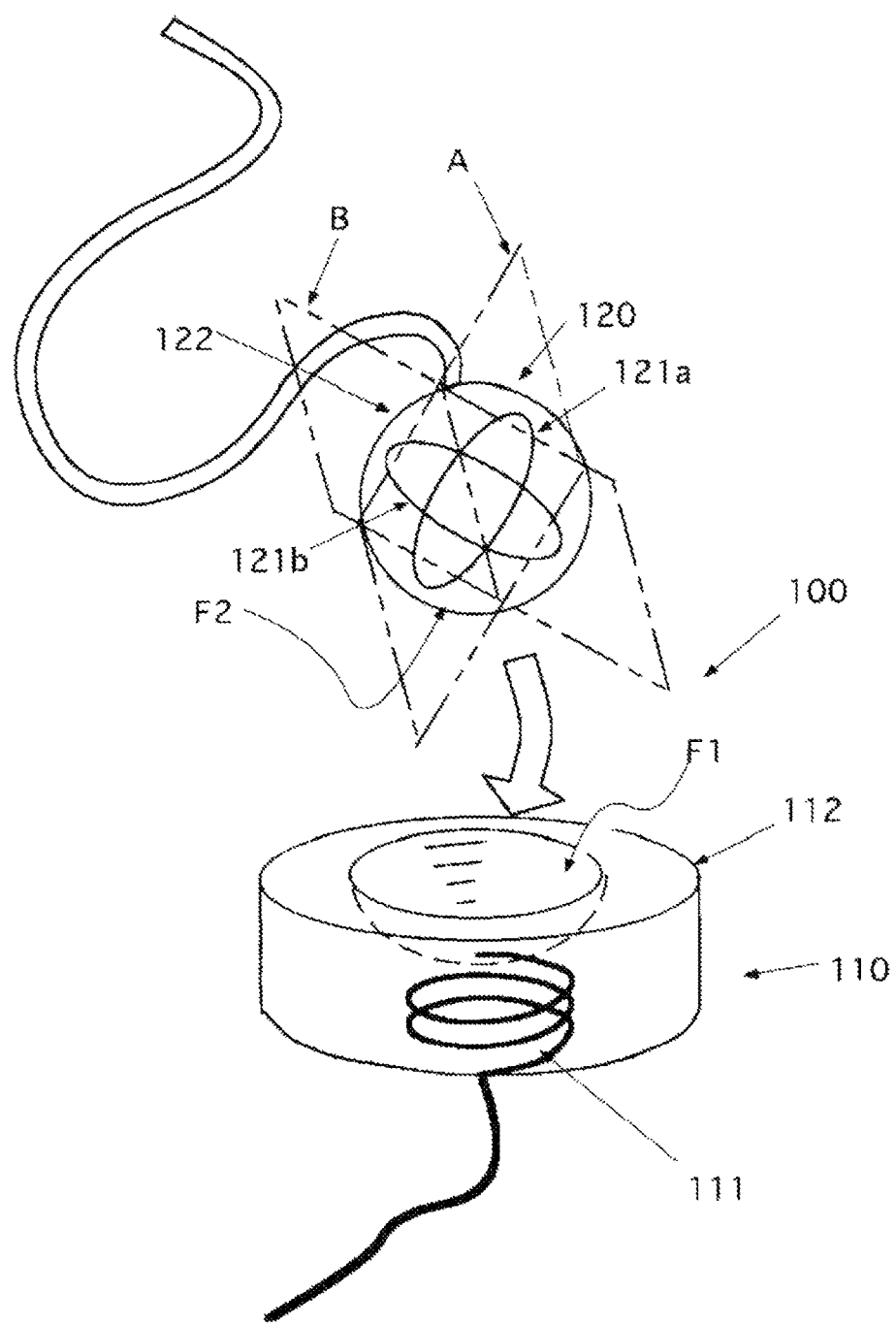
FIG. 7 is a diagram of a wireless power transfer system according to a seventh embodiment of the present disclosure.

FIG. 1 is a diagram of a wireless power transfer system according to a first embodiment of the present disclosure.
FIG. 2 is a diagram of a wireless power transfer system according to a second embodiment of the present disclosure.
FIG. 3 is a diagram of a wireless power transfer system according to a third embodiment of the present disclosure.
FIG. 4 is a diagram of a wireless power transfer system according to a fourth embodiment of the present disclosure.
FIG. 5 is a diagram of a wireless power transfer system according to a fifth embodiment of the present disclosure.
FIG. 6 is a diagram of a wireless power transfer system according to a sixth embodiment of the present disclosure.
FIG. 7 is a diagram of a wireless power transfer system according to a seventh embodiment of the present disclosure.

The wireless power transfer system according to the first embodiment of the present disclosure is a system that performs wireless power transfer.

In FIG. 1, the diagram of the wireless power transfer system according to the first embodiment of the present disclosure is illustrated.

The wireless power transfer system 100 according to the first embodiment of the present disclosure includes a power supply primary coil 110 and a power supply secondary coil 120.

The wireless power transfer can be performed between the power supply primary coil 110 and the power supply secondary coil 120.

For example, the wireless power transfer can be performed from the power supply primary coil 110 to the power supply secondary coil 120. For example, the wireless power transfer can be performed from the power supply secondary coil 120 to the power supply primary coil 110.

For convenience of explanation, hereinafter, an exemplary case where the wireless power transfer is performed from the power supply primary coil 110 to the power supply secondary coil 120 will be described.

The power supply primary coil 110 is capable of performing the wireless power transfer.

The power supply primary coil 110 contains a primary coil wire 111 for the wireless power transfer, and forms a primary outer shape (primary shape) F1.

The power supply primary coil 110 includes the primary coil wire 111 and a primary coil case 112.

The primary coil wire 111 is an electric magnetic circuit in which a DC current or an AC current flows to generate a magnetic field.

The primary coil case 112 contains the primary coil wire 111.

The primary coil case 112 forms the primary outer shape F1.

The primary outer shape F1 has a surface.

The primary outer shape F1 may have a planar surface on a part of the primary outer shape F1.

The power supply secondary coil 120 is capable of performing the wireless power transfer between the power supply primary coil 110 and the power supply secondary coil 120.

The power supply secondary coil 120 contains a secondary coil wire 121 for the wireless power transfer, and forms a secondary outer shape (secondary shape) F2.

The secondary outer shape F2 has a surface.

The secondary outer shape F2 has a projecting surface on at least a part of the secondary outer shape F2.

The power supply primary coil 110 and the power supply secondary coil 120 are capable of performing the wireless power transfer, with the projecting surface of the secondary outer shape F2 directed to the power supply primary coil 110.

The power supply primary coil 110 and the power supply secondary coil 120 are capable of performing the wireless power transfer, with the projecting surface held by the secondary outer shape F2 directed to the planar surface held by the primary outer shape F1.

Electric power supplied in a wireless manner from the power supply primary coil 110 can be supplied to the power supply secondary coil 120.

When an electric current flows in the primary coil wire 111, a magnetic field is generated in a space sandwiched between the primary coil wire 111 and the secondary coil wire 121, and the generated magnetic field causes an electric current to flow in the secondary coil wire 121. When a relative posture or position between the power supply primary coil 110 and the power supply secondary coil 120 is set to a predetermined posture or position, electric power can be efficiently supplied in a wireless manner from the power supply primary coil 110 to the power supply secondary coil 120 with a small energy loss.

Next, the wireless power transfer system according to the second embodiment of the present disclosure will be described based on the drawings.

In FIG. 2, the diagram of the wireless power transfer system according to the second embodiment of the present disclosure is illustrated.

The wireless power transfer system 100 according to the second embodiment of the present disclosure includes a power supply primary coil 110 and a power supply secondary coil 120.

Wireless power transfer can be performed between the power supply primary coil 110 and the power supply secondary coil 120.

For example, the wireless power transfer can be performed from the power supply primary coil 110 to the power supply secondary coil 120.

For example, the wireless power transfer can be performed from the power supply secondary coil 120 to the power supply primary coil 110.

For convenience of explanation, hereinafter, the description will be provided based on the premise that the wireless power transfer is performed from the power supply primary coil 110 to the power supply secondary coil 120.

The power supply primary coil 110 is capable of performing the wireless power transfer.

The power supply primary coil 110 contains a primary coil wire 111 for the wireless power transfer, and forms a primary outer shape F1.

The power supply primary coil 110 includes the primary coil wire 111 and a primary coil case 112.

The primary coil wire 111 is an electric magnetic circuit in which a DC current or an AC current flows to generate a magnetic field.

The primary coil case 112 contains the primary coil wire 111.

The primary coil case 112 forms the primary outer shape F1.

The primary outer shape F1 has a surface.

The primary outer shape F1 may have a planar surface on a part of the primary outer shape F1.

The power supply secondary coil 120 is capable of performing the wireless power transfer between the power supply primary coil 110 and the power supply secondary coil 120.

The power supply secondary coil 120 contains a secondary coil wire for the wireless power transfer, and forms a secondary outer shape F2.

The power supply secondary coil 120 includes the secondary coil wire 121 and a secondary coil case 122.

The secondary coil wire 121 is an electric magnetic circuit in which a DC current or an AC current flows to generate a magnetic field.

The secondary coil case 122 contains the secondary coil wire 121.

The secondary coil case 122 forms the secondary outer shape F2.

The primary outer shape F1 has a surface.

The secondary outer shape F2 has a surface.

The secondary outer shape F2 has a projecting surface on at least a part of the secondary outer shape F2.

The secondary outer shape F2 has a projecting curved surface on at least a part of the secondary outer shape F2.

In FIG. 2, it is illustrated that the secondary outer shape F2 has a spherical curved surface.

The power supply primary coil 110 and the power supply secondary coil may be capable of performing the wireless power transfer, with the projecting curved surface of the secondary outer shape F2 directed to the power supply primary coil 110.

The power supply primary coil 110 and the power supply secondary coil may be capable of performing the wireless power transfer, with the projecting curved surface held by the secondary outer shape F2 directed to the planar surface held by the primary outer shape F1.

A gravity center point of the power supply secondary coil may be offset from a curvature center of the projecting curved surface and located on a side of the projecting curved surface.

As a result, the gravity center point of the power supply secondary coil may be located between the curvature center of the projecting curved surface and the projecting curved surface.

The power supply primary coil 110 and the power supply secondary coil 120 may be capable of performing the wireless power transfer, with the projecting curved surface of the secondary outer shape directed to the power supply primary coil 110.

The power supply primary coil 110 and the power supply secondary coil 120 may be capable of performing the wireless power transfer, with the projecting curved surface held by the secondary outer shape F2 directed to the planar surface of the primary outer shape F1.

In FIG. 2, it is illustrated that the power supply secondary coil 120 has a weight on the offset position. As a result, the gravity center point of the power supply secondary coil 120 is located between the curvature center of the projecting curved surface and the projecting curved surface.

Electric power supplied in a wireless manner from the power supply primary coil 110 can be supplied to the power supply secondary coil 120.

When an electric current flows in the primary coil wire 111, a magnetic field is generated in a space sandwiched between the primary coil wire 111 and the secondary coil wire 121, and the generated magnetic field causes an electric current to flow in the secondary coil wire 121.

When a relative posture or position between the power supply primary coil 110 and the power supply secondary coil 120 is set to a predetermined posture or position, electric power can be efficiently supplied in a wireless manner from the power supply primary coil 110 to the power supply secondary coil 120 with a small energy loss.

Next, the wireless power transfer system according to the third embodiment of the present disclosure will be described based on the drawings.

FIG. 3 is the diagram illustrating the concept of the wireless power transfer system according to the third embodiment of the present disclosure.

The wireless power transfer system 100 according to the third embodiment of the present disclosure includes a power supply primary coil 110 and a power supply secondary coil 120.

The wireless power transfer can be performed between the power supply primary coil 110 and the power supply secondary coil 120.

For example, the wireless power transfer can be performed from the power supply primary coil 110 to the power supply secondary coil 120.

For example, the wireless power transfer can be performed from the power supply secondary coil 120 to the power supply primary coil 110.

For convenience of explanation, hereinafter, the description will be provided based on the premise that the wireless power transfer is performed from the power supply primary coil 110 to the power supply secondary coil 120.

The power supply primary coil 110 is capable of performing the wireless power transfer.

The power supply primary coil 110 contains a primary coil wire 111 for the wireless power transfer, and forms a primary outer shape F1.

The power supply primary coil 110 includes the primary coil wire 111 and a primary coil case 112.

The primary coil wire 111 is an electric magnetic circuit in which a DC current or an AC current flows to generate a magnetic field.

The primary coil case 112 contains the primary coil wire 111.

The primary coil case 112 forms the primary outer shape F1.

The primary outer shape F1 has a depression in a part of the primary outer shape F1.

The depression may be a recessed curved surface.

The recessed curved surface may have a radius of curvature equal to or slightly greater than a radius of curvature of a projecting curved surface held by a secondary outer shape F2 of the power supply secondary coil 120.

Since the configuration of the power supply secondary coil 120 is the same as those of the wireless power transfer systems according to the first to second embodiments, the description will be omitted.

The power supply primary coil 110 and the power supply secondary coil 120 are capable of performing the wireless power transfer, with the projecting surface held by the secondary outer shape F2 fit into the depression of the primary outer shape F1.

Electric power supplied in a wireless manner from the power supply primary coil 110 can be supplied to the power supply secondary coil 120.

When an electric current flows in the primary coil wire 111, a magnetic field is generated in a space sandwiched between the primary coil wire 111 and the secondary coil wire 121, and the generated magnetic field causes an electric current to flow in the secondary coil wire 121.

When a relative posture or position between the power supply primary coil 110 and the power supply secondary coil 120 is set to a predetermined posture or position, electric power can be efficiently supplied in a wireless manner from the power supply primary coil 110 to the power supply secondary coil 120 with a small energy loss.

Next, the wireless power transfer system according to the fourth embodiment of the present disclosure will be described based on the drawings.

FIG. 4 is the diagram illustrating the concept of the wireless power transfer system according to the fourth embodiment of the present disclosure.

The wireless power transfer system 100 according to the fourth embodiment of the present disclosure includes a power supply primary coil 110 and a power supply secondary coil 120.

The wireless power transfer can be performed between the power supply primary coil 110 and the power supply secondary coil 120.

For example, the wireless power transfer can be performed from the power supply primary coil 110 to the power supply secondary coil 120.

For example, the wireless power transfer can be performed from the power supply secondary coil 120 to the power supply primary coil 110.

For convenience of explanation, hereinafter, the description will be provided based on the premise that the wireless power transfer is performed from the power supply primary coil 110 to the power supply secondary coil 120.

The power supply primary coil 110 is capable of performing the wireless power transfer.

The power supply primary coil 110 contains a primary coil wire 111 for the wireless power transfer, and forms a primary outer shape.

The power supply primary coil 110 includes the primary coil wire 111 and a primary coil case 112.

The primary coil wire 111 is an electric magnetic circuit in which a DC current or an AC current flows to generate a magnetic field.

The primary coil case 112 contains the primary coil wire 111.

The primary coil case 112 forms the primary outer shape F1.

The primary outer shape F1 has a depression in a part of the primary outer shape F1.

The depression includes a first depression and a second depression.

The second depression is located at a center of the first depression and smaller than the first depression.

The first depression may be a recessed curved surface.

The second depression may be a recessed curved surface.

The recessed curved surface of the second depression may have a radius of curvature equal to or slightly greater than a radius of curvature of a projecting curved surface held by a secondary outer shape F2 of the power supply secondary coil.

Since the configuration of the power supply secondary coil 120 is the same as those of the wireless power transfer systems according to the first to second embodiments, the description will be omitted.

The power supply primary coil 110 and the power supply secondary coil 120 are capable of performing the wireless power transfer, with the projecting surface of the secondary outer shape F2 fit into the second depression of the primary outer shape F1.

Electric power supplied in a wireless manner from the power supply primary coil 110 can be supplied to the power supply secondary coil 120.

When an electric current flows in the primary coil wire 111, a magnetic field is generated in a space sandwiched between the primary coil wire 111 and the secondary coil wire 121, and the generated magnetic field causes an electric current to flow in the secondary coil wire 121.

When a relative posture or position between the power supply primary coil 110 and the power supply secondary coil 120 is set to a predetermined posture or position, electric power can be efficiently supplied in a wireless manner from the power supply primary coil 110 to the power supply secondary coil 120 with a small energy loss.

Next, the wireless power transfer system according to the fifth embodiment of the present disclosure will be described based on the drawings.

FIG. 5 is the diagram illustrating the concept of the wireless power transfer system according to the fifth embodiment of the present disclosure.

The wireless power transfer system 100 according to the fifth embodiment of the present disclosure includes a power supply primary coil 110, a power supply secondary coil 120, and an intermediate case 130.

The wireless power transfer can be performed between the power supply primary coil 110 and the power supply secondary coil 120.

For example, the wireless power transfer can be performed from the power supply primary coil 110 to the power supply secondary coil 120.

For example, the wireless power transfer can be performed from the power supply secondary coil 120 to the power supply primary coil 110.

For convenience of explanation, hereinafter, the description will be provided based on the premise that the wireless power transfer is performed from the power supply primary coil 110 to the power supply secondary coil 120.

Since the configuration of the power supply primary coil 110 is the same as those of the wireless power transfer systems according to the first to fourth embodiments, the description will be omitted.

Since the configuration of the power supply secondary coil 120 is the same as that of the wireless power transfer system according to the second embodiment, the description will be omitted.

The intermediate case 130 is a case that supports the power supply secondary coil 120.

The intermediate case 130 has an inner wall forming a recessed curved surface with a constant radius of curvature that covers the projecting curved surface of the secondary outer shape F2.

The intermediate case 130 forms an intermediate outer shape F3.

The intermediate outer shape F3 may form a projecting surface on a part of the intermediate outer shape F3.

The intermediate outer shape F3 may form a projecting curved surface on a part of the intermediate outer shape F3.

The intermediate outer shape F3 may form a projecting curved surface with a constant radius of curvature on a part of the intermediate outer shape F3.

The intermediate outer shape F3 may form a plane on a part of the intermediate outer shape F3.

The power supply primary coil 110 and the power supply secondary coil 120 are capable of performing the wireless power transfer, with the projecting curved surface of the secondary outer shape F2 guided by the recessed curved surface of the intermediate case 130 and swingable.

The power supply primary coil 110 and the power supply secondary coil 120 may be capable of performing the wireless power transfer, with the projecting surface held by the intermediate outer shape F3 directed to the power supply primary coil 110, and with the projecting curved surface of the secondary outer shape F2 guided by the recessed curved surface of the intermediate case 130 and swingable.

The power supply primary coil 110 and the power supply secondary coil 120 may be capable of performing the wireless power transfer, with the projecting surface held by the intermediate outer shape F3 directed to the power supply primary coil 110, and with the projecting curved surface of the secondary outer shape F2 guided by the recessed curved surface of the intermediate case 130 and swingable.

The power supply primary coil 110 and the power supply secondary coil 120 may be capable of performing the wireless power transfer, with the plane held by the intermediate outer shape F3 directed to the power supply primary coil 110, and with the projecting curved surface of the secondary outer shape F2 guided by the recessed curved surface of the intermediate case 130 and swingable.

The power supply primary coil 110 and the power supply secondary coil 120 may be capable of performing the wireless power transfer, with the plane held by the intermediate outer shape F3 directed to a plane of the primary outer shape F1, and with the projecting curved surface of the secondary outer shape F2 guided by the recessed curved surface of the intermediate case 130 and swingable.

Electric power supplied in a wireless manner from the power supply primary coil 110 can be supplied to the power supply secondary coil 120.

When an electric current flows in the primary coil wire 111, a magnetic field is generated in a space sandwiched between the primary coil wire 111 and the secondary coil wire 121, and the generated magnetic field causes an electric current to flow in the secondary coil wire 121.

When a relative posture or position between the power supply primary coil 110 and the power supply secondary coil 120 is set to a predetermined posture or position, electric power can be efficiently supplied in a wireless manner from the power supply primary coil 110 to the power supply secondary coil 120 with a small energy loss.

Next, the wireless power transfer system according to the sixth embodiment of the present disclosure will be described based on the drawings.

FIG. 6 is the diagram illustrating the concept of the wireless power transfer system according to the sixth embodiment of the present disclosure.

The wireless power transfer system 100 according to the sixth embodiment of the present disclosure includes a power supply primary coil 110, a power supply secondary coil 120, and an intermediate case 130.

The wireless power transfer can be performed between the power supply primary coil 110 and the power supply secondary coil 120.

For example, the wireless power transfer can be performed from the power supply primary coil 110 to the power supply secondary coil 120.

For example, the wireless power transfer can be performed from the power supply secondary coil 120 to the power supply primary coil 110.

For convenience of explanation, hereinafter, the description will be provided based on the premise that the wireless power transfer is performed from the power supply primary coil 110 to the power supply secondary coil 120.

Since the configuration of the power supply primary coil 110 is the same as those of the wireless power transfer systems according to the first to fourth embodiments, the description will be omitted.

Since the configuration of the power supply secondary coil 120 is the same as that of the wireless power transfer system according to the second embodiment, the description will be omitted.

The intermediate case 130 is a case that supports the power supply secondary coil.

The intermediate case 130 contains an intermediate coil wire 131.

The intermediate case 130 has an inner wall forming a recessed curved surface with a constant radius of curvature that covers the projecting curved surface of the secondary outer shape.

The intermediate case 130 forms an intermediate outer shape F3.

The intermediate outer shape F3 may form a projecting surface on a part of the intermediate outer shape F3.

The intermediate outer shape F3 may form a projecting curved surface on a part of the intermediate outer shape F3.

The intermediate outer shape F3 may form a projecting curved surface with a constant radius of curvature on a part of the intermediate outer shape F3.

The intermediate outer shape F3 may form a plane on a part of the intermediate outer shape F3.

The power supply primary coil 110 and the power supply secondary coil 120 are capable of performing the wireless power transfer relayed by the intermediate coil wire 131.

The power supply primary coil and the power supply secondary coil are capable of performing the wireless power transfer relayed by the intermediate coil wire, with the projecting curved surface of the secondary outer shape F2 guided by the recessed curved surface of the intermediate case 130 and swingable.

Electric power supplied in a wireless manner from the power supply primary coil 110 can be supplied to the power supply secondary coil 120.

When an electric current flows in the primary coil wire 111, a magnetic field is generated in a space sandwiched between the primary coil wire 111, the secondary coil wire 121, and the intermediate coil wire 131, and the generated magnetic field causes an electric current to flow in the secondary coil wire 121.

When a relative posture or position between the power supply primary coil 110 and the power supply secondary coil 120 is set to a predetermined posture or position, electric power can be efficiently supplied in a wireless manner from the power supply primary coil 110 to the power supply secondary coil 120 with a small energy loss.

The wireless power transfer system according to the seventh embodiment of the present disclosure is a system that performs wireless power transfer.

In FIG. 7, the diagram of the wireless power transfer system according to the seventh embodiment of the present disclosure is illustrated.

The wireless power transfer system 100 according to the seventh embodiment of the present disclosure includes a power supply primary coil 110 and a power supply secondary coil 120.

The wireless power transfer can be performed between the power supply primary coil 110 and the power supply secondary coil 120.

For example, the wireless power transfer can be performed from the power supply primary coil 110 to the power supply secondary coil 120.

For example, the wireless power transfer can be performed from the power supply secondary coil 120 to the power supply primary coil 110.

For convenience of explanation, hereinafter, the description will be provided based on the premise that the wireless power transfer is performed from the power supply primary coil 110 to the power supply secondary coil 120.

Since the configuration of the power supply primary coil 110 is the same as those of the wireless power transfer systems according to the first to fourth embodiments, the description will be omitted.

The power supply secondary coil 120 is capable of performing the wireless power transfer between the power supply primary coil 110 and the power supply secondary coil 120.

The power supply secondary coil 120 contains a pair of secondary coil wires 121 for the wireless power transfer, and forms a secondary outer shape.

The pair of secondary coil wires 121 includes a first secondary coil wire 121a and a second secondary coil wire 121b.

The first secondary coil wire 121a is wound along a first virtual surface A.

The second secondary coil wire 121b is wound along a second virtual surface B.

The first virtual surface A and the second virtual surface B intersect.

The first virtual surface A and the second virtual surface B may be orthogonal to each other.

The secondary outer shape F2 has a projecting surface on at least a part of the secondary outer shape F2.

Since the configuration of the secondary outer shape F2 is the same as those of the wireless power transfer systems according to the first to sixth embodiments, the description will be omitted.

Electric power supplied in a wireless manner from the power supply primary coil 110 can be supplied to the power supply secondary coil 120.

When an electric current flows in the primary coil wire 111, a magnetic field is generated in a space sandwiched between the primary coil wire 111 and the secondary coil wire 121, and the generated magnetic field causes an electric current to flow in the first secondary coil wire 121a and the second secondary coil wire 121b.

When a relative posture or position between the power supply primary coil 110 and the power supply secondary coil 120 is set to a predetermined posture or position, electric power can be efficiently supplied in a wireless manner from the power supply primary coil 110 to the power supply secondary coil 120 with a small energy loss.

Next, an object power supply device for practicing the present disclosure will be described with reference to the drawings.

First, an object power supply device according to the first embodiment of the present disclosure will be described based on the drawings.

Figure 8A:
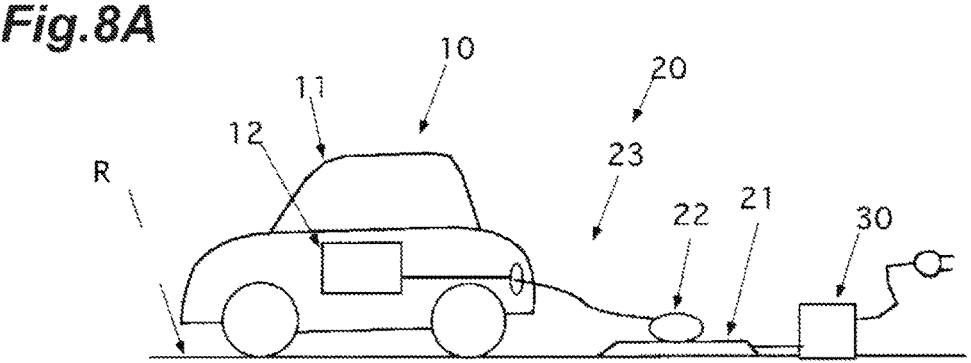
FIGS. 8A and 8B are diagrams of an object power supply device according to the first embodiment of the present disclosure.
Figure 8B:
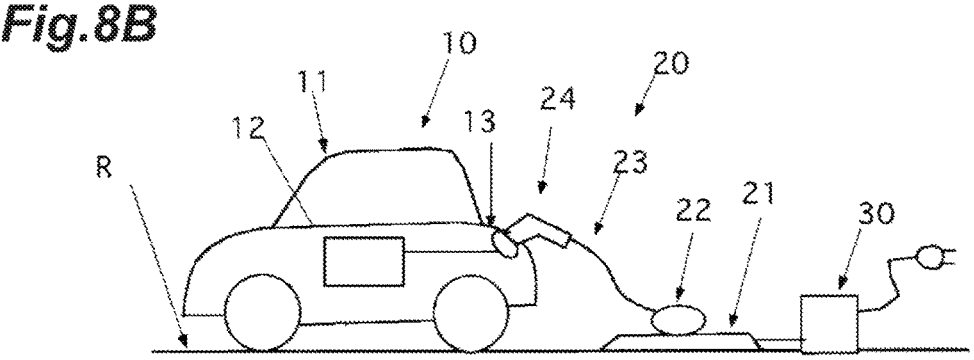
Figure 10:
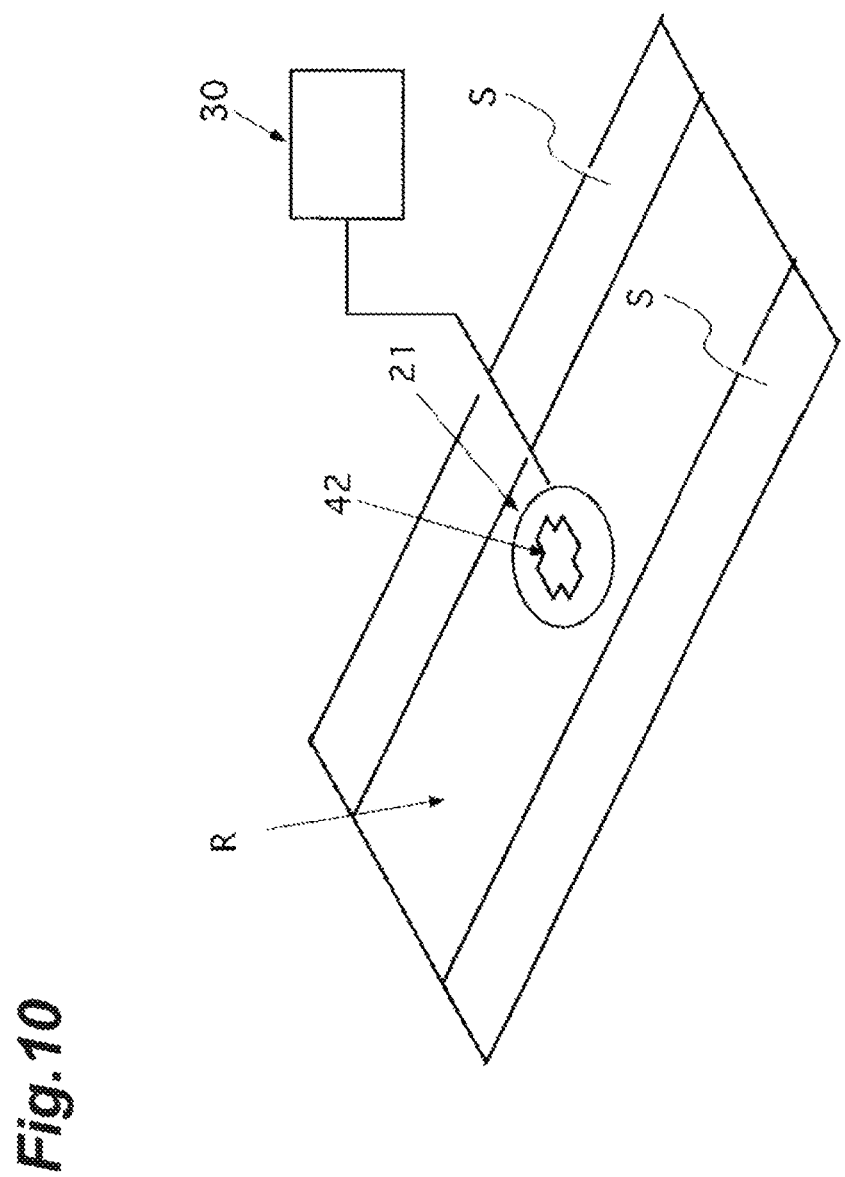
FIG. 10 is a perspective view of the object power supply device according to the first embodiment of the present disclosure.

FIGS. 8A and 8B are diagrams of the object power supply device according to the first embodiment of the present disclosure. FIG. 9 is a partial view of the object power supply device according to the first embodiment of the present disclosure. FIG. 10 is a perspective view of the object power supply device according to the first embodiment of the present disclosure.

The object power supply device according to the first embodiment of the present disclosure is a device that can supply electric power to an object.

The object is driven by electric power, examples of which include electric apparatuses, vehicles, moving bodies, and ships or the like. For convenience of explanation, hereinafter, the description will be provided based on the assumption that the object is a vehicle.

The object power supply device according to the first embodiment of the present disclosure includes a charging cable 20.

The object power supply device according to the first embodiment of the present disclosure may include the charging cable 20 and a power supply primary coil 21.

The object power supply device according to the first embodiment of the present disclosure may include the charging cable 20, the power supply primary coil 21, and a drive circuit 30.

The vehicle 10 is a movable body capable of receiving power supply.

For example, the vehicle 10 is a car capable of receiving power supply.

The vehicle 10 includes a vehicle main body 11 and a power receiving circuit 12.

The vehicle 10 may include the vehicle main body 11, the power receiving circuit 12, and a power supply plug receiver 13.

The vehicle main body 11 is the vehicle itself.

For example, the vehicle is an electric car and a hybrid car or the like.

The power receiving circuit 12 is an electric apparatus that receives electric power supplied from the outside.

For example, the power receiving circuit 12 charges an incorporated battery of the vehicle main body 11 with electric power supplied from the outside.

The power supply plug receiver 13 is an electric element that is joined to a power supply plug 24 mechanically, electrically, detachably, and attachably.

The charging cable 20 is a cable that conducts electric power to the vehicle for power supply.

The charging cable 20 includes a power supply secondary coil 22 and an electric circuit 23.

The charging cable 20 may include the power supply secondary coil 22, the electric circuit 23, and the power supply plug 24.

The charging cable 20 may include the power supply secondary coil 22, the electric circuit 23, the power supply plug 24, and a converter unit 25.

The power supply secondary coil 22 is an electric element electrically connected to the electric circuit 23 which will be described later, and capable of receiving wireless power transfer from the power supply primary coil 21.

The power supply secondary coil can be separated from the vehicle, with the electric circuit electrically connected to the power receiving circuit.

The power supply secondary coil can be separated from the vehicle by a distance by which the electric circuit 23 extends, with the electric circuit electrically connected to the power receiving circuit.

To the power supply secondary coil 22, electric power may be supplied in a wireless manner from the power supply primary coil 21 placed below the power supply secondary coil 22.

For example, to the power supply secondary coil 22, electric power is supplied in a wireless manner using a magnetic field resonance type from the power supply primary coil 21 placed below the power supply secondary coil 22.

For example, to the power supply secondary coil 22, electric power is supplied in a wireless manner using an electric field resonance type from the power supply primary coil 21 placed below the power supply secondary coil 22.

For example, to the power supply secondary coil 22, electric power is supplied in a wireless manner using an electromagnetic induction type from the power supply primary coil 21 placed below the power supply secondary coil 22.

Since the configurations of the power supply primary coil 21 and the power supply secondary coil 22 are the same as one of those of the wireless power transfer systems 100 according to the first to seventh embodiments, the description will be omitted.

The electric circuit 23 is an electric element that is electrically connectable to the power receiving circuit 12 of the vehicle 10.

The electric circuit 23 conducts, to the power receiving circuit 12 of the vehicle 10, electric power supplied in a wireless manner to the power supply secondary coil 22.

The electric circuit 23 is an electric cable, one end of which may be directly and electrically connected to the power receiving circuit 12 of the vehicle 10, and the other end may be electrically connected to the power supply secondary coil 22.

For example, the electric circuit 23 is an electric cable housed inside the vehicle 10. The electric cable is pulled to be drawn out of the vehicle 10.

In FIG. 8A, it is illustrated that the electric circuit is drawn out of the vehicle 10.

The electric circuit 23 is an electric cable, one end of which may be electrically coupled to the power receiving circuit 12 of the vehicle 10 via the power supply plug 24, and the other end may be electrically connected to the power supply secondary coil 22.

The power supply plug 24 is an electric element that is connected to the power supply plug receiver 13 of the vehicle 10 detachably, attachably, electrically, and mechanically.

In FIG. 8B, it is illustrated that the power supply plug 24 is connected to the power supply plug receiver 13 of the vehicle.

The converter unit 25 is an electric element that converts an electrical specification of electric power supplied in a wireless manner to the power supply secondary coil 22 to an electrical specification of electric power of the power receiving circuit 12 of the vehicle 10.

The converter unit 25 may convert a frequency, a voltage, and a phase of electric power supplied in a wireless manner to the power supply secondary coil 22 to a frequency, a voltage, and a phase of electric power of the power receiving circuit 12 of the vehicle 10.

The converter unit 25 may rectify and convert a voltage and a phase of electric power supplied in a wireless manner to the power supply secondary coil 22 to a DC current of a predetermined voltage of electric power of the power receiving circuit 12 of the vehicle 10.

The power supply primary coil 21 is capable of performing the wireless power transfer to the power supply secondary coil 22.

The power supply primary coil 21 is provided at a storage space R that is a space in which the vehicle is stored, and capable of performing the wireless power transfer to the power supply secondary coil 22.

When an electric current flows in the power supply primary coil 21, a magnetic field is generated in the space, and an induction current by the magnetic field is generated in the power supply secondary coil 22 that exists in the magnetic field.

For example, when an alternating current flows in the power supply primary coil 21, a magnetic field is generated in the space, and an induction current by the magnetic field is generated in the power supply secondary coil 22 that exists in the magnetic field.

The drive circuit 30 is a circuit that drives the power supply primary coil 21.

For example, the drive circuit 30 is a circuit that supplies electric power to the power supply primary coil 21 to drive the power supply primary coil 21.

When the drive circuit 30 supplies electric power to the power supply primary coil 21 to drive the power supply primary coil 21, the power supply primary coil generates a magnetic field.

When the drive circuit 30 appropriately drives the power supply primary coil 21, the wireless power transfer can be efficiently performed.

The storage space R is a space for storing the vehicle 10.

At the storage space R, a mark 42 may be drawn at a position where the power supply primary coil 21 is provided.

When the power supply secondary coil 22 is placed in accordance with the mark, the wireless power transfer can be performed from the power supply primary coil 21 to the power supply secondary coil 22.

In FIG. 10, it is illustrated that the cross mark 42 is drawn at the position of the storage space R where the power supply primary coil 21 is provided.

At the storage space R, a depression 43 may be formed in a position where the power supply primary coil 21 is provided.

When the power supply secondary coil 22 is placed in the depression 43, the wireless power transfer can be performed from the power supply primary coil 21 to the power supply secondary coil 22.

The depression 43 may be a hole into which a part of the secondary outer shape of the power supply secondary coil 22 is fit.

The depression 43 may be a cone-shaped hole, a central part of which is deepened when viewed from above.

In FIG. 9, it is illustrated that the bowl-shaped depression 43 is formed in an upper part of the power supply primary coil 21.

In a case where the wireless power transfer cannot be performed from the power supply primary coil 21 to the power supply secondary coil 22 from when the vehicle 10 is stored at the storage space until a predetermined time has elapsed, a predetermined signal may be output.

For example, a sensor provided at the storage space detects that the vehicle 10 is stored at the storage space.

For example, when a communication apparatus of the vehicle and a communication apparatus of the storage space start to communicate with each other, it is determined that the vehicle 10 is stored at the storage space.

For example, when the drive circuit 30 determines that a load acting on the power supply primary coil 21 is small, it is determined that the wireless power transfer cannot be performed from the power supply primary coil 21 to the power supply secondary coil 22.

For example, when a sensor provided at a place where the power supply primary coil 21 is placed detects that the power supply secondary coil is not at an appropriate position, it is determined that the wireless power transfer cannot be performed from the power supply primary coil 21 to the power supply secondary coil 22.

When the predetermined signal is output, a driver or an occupant of the vehicle 10 is notified of that fact by sound or display.

When a capacitor of the vehicle 10 is fully charged after the vehicle 10 is stored at the storage space, it may be determined that the wireless power transfer is not to be performed from the power supply primary coil 21 to the power supply secondary coil 22.

When it is determined that the wireless power transfer is not to be performed from the power supply primary coil 21 to the power supply secondary coil 22, a driver or an occupant of the vehicle 10 is notified of that fact by sound or display.

Hereinafter, operation of the object power supply device according to the first embodiment of the present disclosure will be described.

The vehicle 10 enters the storage space R and stops.

The charging cable 20 is drawn out, and the power supply secondary coil 22 is placed near the power supply primary coil 21.

For example, the power supply secondary coil 22 is placed in accordance with the mark 42.

For example, the power supply secondary coil 22 is placed in the depression 43.

When the charging cable 20 has the power supply plug 24, the power supply plug 24 is inserted into the power supply plug receiver 13.

The drive circuit 30 performs driving so that the wireless power transfer is performed from the power supply primary coil 21 to the power supply secondary coil 22.

Electric power supplied in a wireless manner from the power supply primary coil 21 to the power supply secondary coil 22 is supplied to the power receiving circuit 12 via the charging cable 20.

When the charging cable 20 includes the converter unit 25, an AC current having a predetermined frequency and a predetermined voltage may be supplied to the power receiving circuit 12 via the charging cable 20.

When the charging cable 20 includes the converter unit 25, a DC current having a predetermined voltage may be supplied to the power receiving circuit 12 via the charging cable 20.

When the power receiving circuit 12 notifies that it has finished receiving electric power, the charging cable 20 is tidied up.

Next, an object power supply device according to the second embodiment of the present disclosure will be described based on the drawings.

Figure 11:
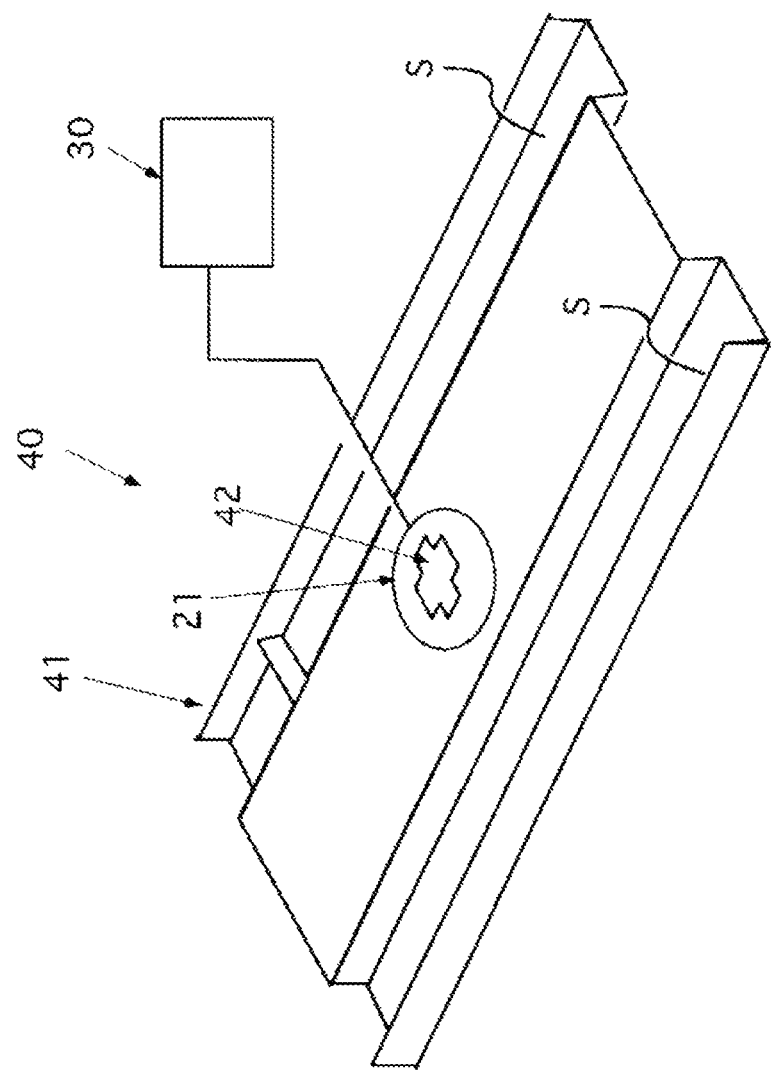
FIG. 11 is a perspective view of an object power supply device according to the second embodiment of the present disclosure.

FIG. 11 is a perspective view of the object power supply device according to the second embodiment of the present disclosure.

The object power supply device according to the second embodiment of the present disclosure is a device that can supply electric power to an object.

The object is driven by electric power, examples of which include electric apparatuses, vehicles, moving bodies, and ships or the like.

For convenience of explanation, hereinafter, the description will be provided based on the assumption that the object is a vehicle.

The object power supply device according to the second embodiment of the present disclosure includes a charging cable 20 and an object support structure 40.

The object power supply device according to the second embodiment of the present disclosure may include the charging cable 20, a power supply primary coil 21, and the object support structure 40.

The object power supply device according to the second embodiment of the present disclosure may include the charging cable 20, the power supply primary coil 21, a drive circuit 30, and the object support structure 40.

Since the configurations of the vehicle 10, the charging cable 20, the power supply primary coil 21, and the drive circuit 30 are the same as those of the object power supply device according to the first embodiment, the description will be omitted.

The object support structure 40 is a structure that supports the vehicle 10.

The object support structure 40 includes an object support structure main body 41.

The object support structure 40 includes the object support structure main body 41 and a mark 42.

The object support structure 40 includes the object support structure main body 41 and a depression 43.

The object support structure 40 includes the object support structure main body 41, the mark 42, and the depression 43.

In FIG. 11, an example of the object support structure main body 41 is illustrated.

The object support structure main body 41 forms a pair of left and right running surfaces S.

The vehicle rolls wheels to the running surfaces S to load onto the object support structure 40.

A wheel stopper is provided on the running surface S so as to prevent the wheels from rolling.

The pair of left and right running surfaces S is a part that supports each of a pair of front and rear wheels of the vehicle 10.

The pair of left and right running surfaces S integrally supports the vehicle 10.

Since the configurations of the mark 42 and the depression 43 are the same as those of the object power supply device 100 according to the first embodiment except that they are provided at the object support structure main body 41, the description will be omitted.

Since the power supply secondary coil 22 is the same as one of those of the wireless power transfer systems according to the first to seventh embodiments, the description will be omitted.

Since the shape of the depression 43 is the same as the shapes of the depressions of the wireless power transfer systems according to the third to seventh embodiments, the description will be omitted.

In a case where the wireless power transfer cannot be performed from the power supply primary coil 21 to the power supply secondary coil 22 from when the vehicle 10 is supported by the object support structure 40 until a predetermined time has elapsed, a predetermined signal may be output.

For example, a sensor provided at the object support structure 40 detects that the vehicle 10 is stored at a storage space.

For example, when a communication apparatus of the vehicle and a communication apparatus of the storage space start to communicate with each other, it is determined that the vehicle 10 is stored at the storage space.

For example, when the drive circuit 30 determines that a load acting on the power supply primary coil 21 is small, it is determined that the wireless power transfer cannot be performed from the power supply primary coil 21 to the power supply secondary coil 22.

For example, when a sensor provided at a place where the power supply primary coil 21 is placed detects that the power supply secondary coil is not at an appropriate position, it is determined that the wireless power transfer cannot be performed from the power supply primary coil 21 to the power supply secondary coil 22.

When the predetermined signal is output, a driver or an occupant of the vehicle 10 is notified of that fact by sound or display.

When a capacitor of the vehicle 10 is fully charged after the vehicle 10 is supported by the object support structure 40, it may be determined that the wireless power transfer is not to be performed from the power supply primary coil 21 to the power supply secondary coil 22.

For example, by communicating with the communication apparatus of the vehicle 10, it is detected that the capacitor of the vehicle 10 is fully charged.

When it is determined that the wireless power transfer is not to be performed from the power supply primary coil 21 to the power supply secondary coil 22, a driver or an occupant of the vehicle 10 is notified of that fact by sound or display.

Since operation of the object power supply device according to the second embodiment is the same as that of the object power supply device according to the first embodiment, the description will be omitted.

Next, an object power supply device according to the third embodiment of the present disclosure will be described based on the drawings.

Figure 12:
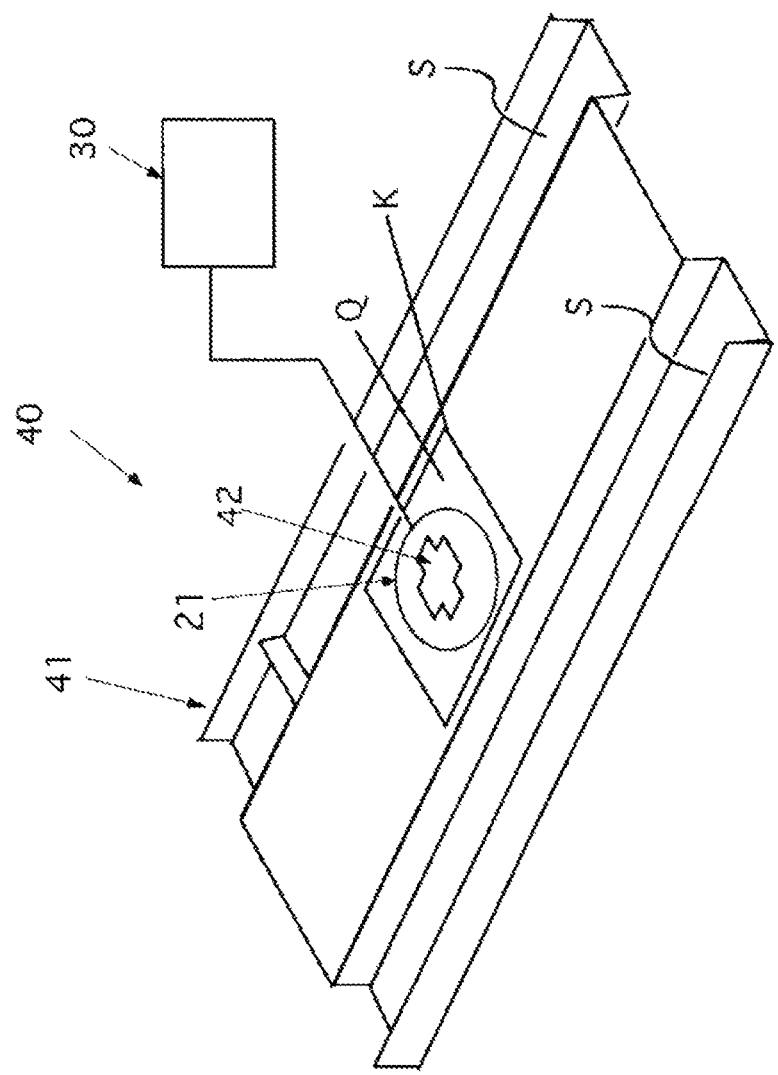
FIG. 12 is a perspective view of an object power supply device according to the third embodiment of the present disclosure.
Figures 13A, 13B:
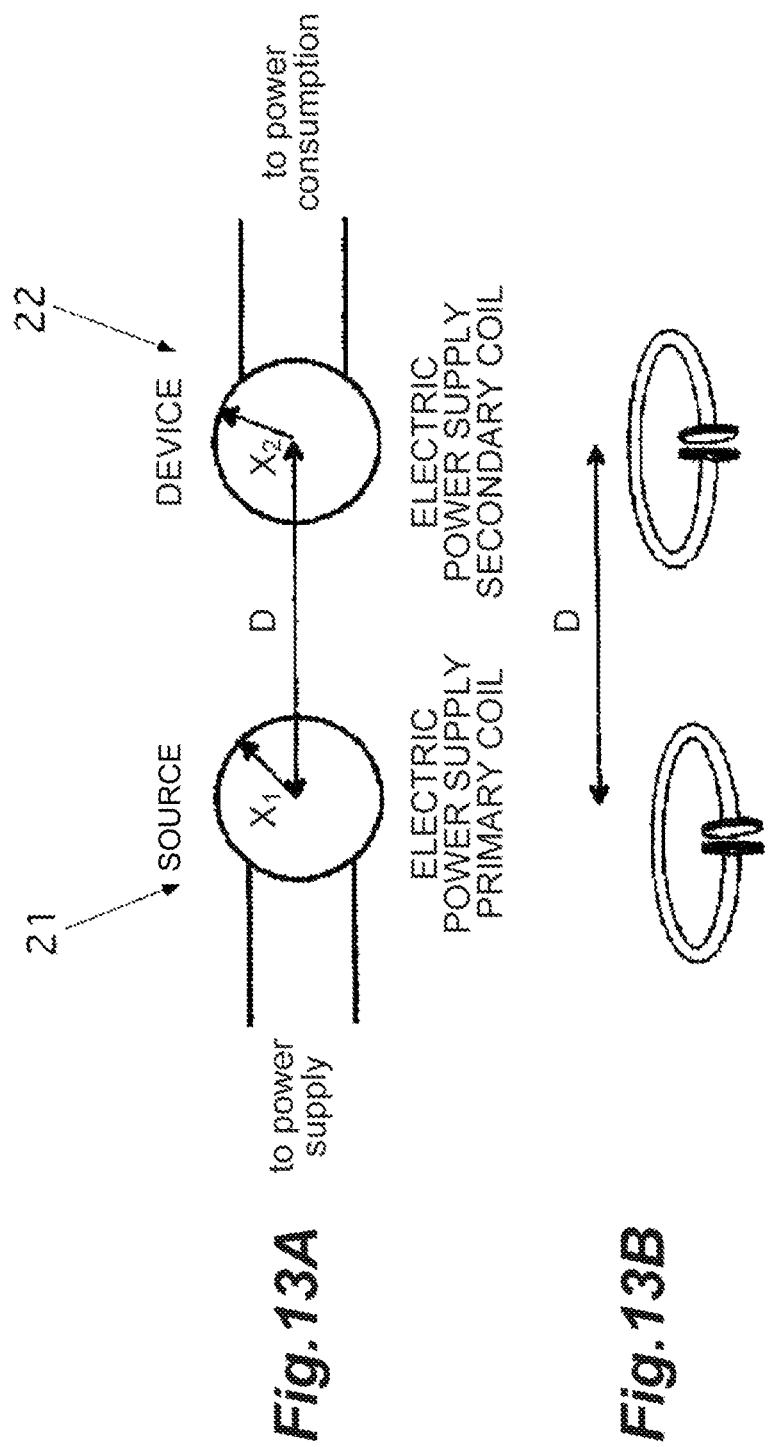
FIGS. 13A and 13B are diagrams illustrating a concept of a wireless power transfer system.

FIG. 12 is a perspective view of the object power supply device according to the third embodiment of the present disclosure.

The object power supply device according to the third embodiment of the present disclosure is a device that can supply electric power to an object.

The object is driven by electric power, examples of which include electric apparatuses, vehicles, moving bodies, and ships or the like.

For convenience of explanation, hereinafter, the description will be provided based on the assumption that the object is a vehicle.

The object power supply device according to the third embodiment of the present disclosure includes a charging cable 20 and an object support structure 40.

The object power supply device according to the third embodiment of the present disclosure may include the charging cable 20, a power supply primary coil 21, and the object support structure 40.

The object power supply device according to the third embodiment of the present disclosure may include the charging cable 20, the power supply primary coil 21, a drive circuit 30, and the object support structure 40.

Since the configurations of the vehicle 10, the charging cable 20, the power supply primary coil 21, and the drive circuit 30 are the same as those of the object power supply device according to the first embodiment, the description will be omitted.

The object support structure 40 is a structure that supports the vehicle 10.

The object support structure 40 includes an object support structure main body 41.

The object support structure 40 includes the object support structure main body 41 and a mark 42.

The object support structure 40 includes the object support structure main body 41 and a depression 43.

The object support structure 40 includes the object support structure main body 41, the mark 42, and the depression 43.

For example, the object support structure main body 41 may be a structure having a substantially quadrilateral shape when viewed from above that holds wheels of the vehicle 10 to support the vehicle, and may be provided with a void Q having a predetermined contour K and penetrating in a vertical direction.

For example, the vehicle support structure main body 41 is a so-called pallet, and provided with the void Q in a central part of the pallet when viewed from above.

The void Q is surrounded by the contour K.

For example, the pallet rolls the wheels provided at a lower part thereof, and can move between a carrying device of the pallet and a parking space.

The power supply primary coil 21 performs the wireless power transfer to the power supply secondary coil 22 via the void Q surrounded by the contour K.

When viewed from above, the power supply primary coil 21 may be surrounded by the contour K.

In FIG. 12, an example of the object support structure main body 41 is illustrated.

The object support structure main body 41 forms a pair of left and right running surfaces S.

The vehicle rolls the wheels to the running surfaces S to load onto the object support structure 40.

A wheel stopper is provided on the running surface S so as to prevent the wheels from rolling.

The pair of left and right running surfaces S is a part that supports each of a pair of front and rear wheels of the vehicle 10.

The pair of left and right running surfaces S integrally supports the vehicle 10.

Since the other configurations of the wireless power transfer system according to the third embodiment are the same as those of the object power supply device according to the second embodiment, the description will be omitted.

The wireless power transfer system according to the embodiment of the present disclosure has the following effects owing to its configuration.

The wireless power transfer is performed, with the projecting surface formed on a part of the power supply secondary coil 120 containing the secondary coil wire 121 for the wireless power transfer directed to the power supply primary coil 110. Therefore, the wireless power transfer can be performed, with a relative posture between the power supply primary coil 110 and the power supply secondary coil 120 set to a desired posture.

The wireless power transfer is performed, with the projecting curved surface formed on a part of the power supply secondary coil 120 containing the secondary coil wire 121 for the wireless power transfer directed to the power supply primary coil 110. Therefore, the wireless power transfer can be performed, with the relative posture between the power supply primary coil 110 and the power supply secondary coil 120 set to the desired posture.

The wireless power transfer is performed, with the gravity center point of the power supply secondary coil 120 located between the curvature center of the curved surface and the curved surface, and with the projecting curved surface formed on a part of the power supply secondary coil 120 containing the secondary coil wire 121 for the wireless power transfer directed to the power supply primary coil 110. Therefore, the wireless power transfer can be performed, with the relative posture between the power supply primary coil 110 and the power supply secondary coil 120 set to the desired posture.

The wireless power transfer is performed, with the projecting surface formed on a part of the power supply secondary coil 120 containing the secondary coil wire 121 for the wireless power transfer directed to the power supply primary coil 110 and fit into the depression of the power supply primary coil 110. Therefore, the wireless power transfer can be performed, with the relative posture between the power supply primary coil 110 and the power supply secondary coil 120 set to the desired posture.

The wireless power transfer is performed, with the projecting surface formed on a part of the power supply secondary coil 120 containing the secondary coil wire 121 for the wireless power transfer directed to the power supply primary coil 110 and fit into the second depression located at the center of the first depression of the power supply primary coil 110. Therefore, the wireless power transfer can be performed, with the relative posture between the power supply primary coil 110 and the power supply secondary coil 120 set to the desired posture.

The wireless power transfer is performed, with the projecting curved surface with the constant radius of curvature formed on a part of the power supply secondary coil 120 containing the secondary coil wire 121 for the wireless power transfer covered by the intermediate case, and with the curved surface directed to the power supply primary coil 110. Therefore, the wireless power transfer can be performed, with the relative posture between the power supply primary coil 110 and the power supply secondary coil 120 set to the desired posture.

The wireless power transfer is performed, with the intermediate case 130 containing the intermediate coil wire covering the projecting curved surface with the constant radius of curvature formed on a part of the power supply secondary coil 120 containing the secondary coil wire 121 for the wireless power transfer, and with the curved surface directed to the power supply primary coil 110. Therefore, the wireless power transfer can be performed, with the relative posture between the power supply primary coil 110 and the power supply secondary coil 120 set to the desired posture.

The wireless power transfer is performed, with the projecting surface formed on a part of the power supply secondary coil 120 containing the first secondary coil wire 121a and the second secondary coil 121b respectively wound along the intersecting first virtual surface A and second virtual surface B directed to the power supply primary coil 110. Therefore, the wireless power transfer can be performed, with the relative posture between the power supply primary coil 110 and the power supply secondary coil 120 set to the desired posture.

The object power supply device in which the storage space is provided according to the embodiment of the present disclosure has the following effects owing to its configuration.

The wireless power transfer is performed, with the projecting surface formed on a part of the power supply secondary coil 22 containing the secondary coil wire for the wireless power transfer directed to the power supply primary coil 21 provided at the storage space R. Therefore, the wireless power transfer can be performed, with a relative posture between the power supply primary coil 21 and the power supply secondary coil 22 set to a desired posture.

The wireless power transfer is performed, with the projecting curved surface formed on a part of the power supply secondary coil 22 containing the secondary coil wire for the wireless power transfer directed to the power supply primary coil 21 provided at the storage space R. Therefore, the wireless power transfer can be performed, with the relative posture between the power supply primary coil 21 and the power supply secondary coil 22 set to the desired posture.

The wireless power transfer is performed, with the gravity center point of the power supply secondary coil 22 located between the curvature center of the curved surface and the curved surface, and with the projecting curved surface formed on a part of the power supply secondary coil 22 containing the secondary coil wire for the wireless power transfer directed to the power supply primary coil 21 provided at the storage space R. Therefore, the wireless power transfer can be performed, with the relative posture between the power supply primary coil 21 and the power supply secondary coil 22 set to the desired posture.

The wireless power transfer is performed, with the projecting surface formed on a part of the power supply secondary coil 22 containing the secondary coil wire for the wireless power transfer directed to the power supply primary coil 21 provided at the storage space and fit into the depression 43 of the storage space. Therefore, the wireless power transfer can be performed, with the relative posture between the power supply primary coil 21 and the power supply secondary coil 22 set to the desired posture.

The wireless power transfer is performed, with the projecting surface formed on a part of the power supply secondary coil 22 containing the secondary coil wire for the wireless power transfer directed to the power supply primary coil 21 provided at the storage space and fit into the second depression located at the center of the first depression of the storage space R. Therefore, the wireless power transfer can be performed, with the relative posture between the power supply primary coil 21 and the power supply secondary coil 22 set to the desired posture.

The wireless power transfer is performed, with the projecting curved surface with the constant radius of curvature formed on a part of the power supply secondary coil 22 containing the secondary coil wire for the wireless power transfer covered by the intermediate case, and with the curved surface directed to the power supply primary coil 21 provided at the storage space R. Therefore, the wireless power transfer can be performed, with the relative posture between the power supply primary coil 21 and the power supply secondary coil 22 set to the desired posture.

The wireless power transfer is performed, with the intermediate case containing the intermediate coil wire covering the projecting curved surface with the constant radius of curvature formed on a part of the power supply secondary coil 22 containing the secondary coil wire for the wireless power transfer, and with the curved surface directed to the power supply primary coil 21. Therefore, the wireless power transfer can be performed, with the relative posture between the power supply primary coil 21 and the power supply secondary coil 22 set to the desired posture. The wireless power transfer is performed, with the projecting surface formed on a part of the power supply secondary coil 22 containing the first secondary coil wire and the second secondary coil respectively wound along the intersecting first virtual surface and second virtual surface directed to the power supply primary coil 21 provided at the storage space. Therefore, the wireless power transfer can be performed, with the relative posture between the power supply primary coil 21 and the power supply secondary coil 22 set to the desired posture.

The signal is output in a case where the wireless power transfer cannot be performed from when the vehicle 10 is stored until a predetermined period of time has elapsed. Therefore, it is possible to notify that the power supply secondary coil 22 is forgotten to be placed or that the power supply secondary coil 22 has been placed at an inappropriate place.

The object power supply device in which the object support structure is provided according to the embodiment of the present disclosure has the following effects owing to its configuration.

The wireless power transfer is performed, with the projecting surface formed on a part of the power supply secondary coil 22 containing the secondary coil wire for the wireless power transfer directed to the power supply primary coil 21 provided at the object support structure 40. Therefore, the wireless power transfer can be performed, with the relative posture between the power supply primary coil 21 and the power supply secondary coil 22 set to the desired posture.

The wireless power transfer is performed, with the projecting curved surface formed on a part of the power supply secondary coil 22 containing the secondary coil wire for the wireless power transfer directed to the power supply primary coil 21 provided at the object support structure 40. Therefore, the wireless power transfer can be performed, with the relative posture between the power supply primary coil 21 and the power supply secondary coil 22 set to the desired posture.

The wireless power transfer is performed, with the gravity center point of the power supply secondary coil 22 located between the curvature center of the curved surface and the curved surface, and with the projecting curved surface formed on a part of the power supply secondary coil 22 containing the secondary coil wire for the wireless power transfer directed to the power supply primary coil 21 provided at the object support structure 40. Therefore, the wireless power transfer can be performed, with the relative posture between the power supply primary coil 21 and the power supply secondary coil 22 set to the desired posture.

The wireless power transfer is performed, with the projecting surface formed on a part of the power supply secondary coil 22 containing the secondary coil wire for the wireless power transfer directed to the power supply primary coil 21 provided at the object support structure 40 and fit into the depression 43 of the object support structure 40. Therefore, the wireless power transfer can be performed, with the relative posture between the power supply primary coil 21 and the power supply secondary coil 22 set to the desired posture.

The wireless power transfer is performed, with the projecting surface formed on a part of the power supply secondary coil 22 containing the secondary coil wire for the wireless power transfer directed to the power supply primary coil 21 provided at the object support structure 40 and fit into the second depression located at the center of the first depression of the object support structure. Therefore, the wireless power transfer can be performed, with the relative posture between the power supply primary coil 21 and the power supply secondary coil 22 set to the desired posture.

The wireless power transfer is performed, with the projecting curved surface with the constant radius of curvature formed on a part of the power supply secondary coil 22 containing the secondary coil wire for the wireless power transfer covered by the intermediate case, and with the curved surface directed to the power supply primary coil provided at the object support structure 40. Therefore, the wireless power transfer can be performed, with the relative posture between the power supply primary coil 21 and the power supply secondary coil 22 set to the desired posture.

The wireless power transfer is performed, with the intermediate case containing the intermediate coil wire covering the projecting curved surface with the constant radius of curvature formed on a part of the power supply secondary coil 22 containing the secondary coil wire for the wireless power transfer, and with the curved surface directed to the power supply primary coil. Therefore, the wireless power transfer can be performed, with the relative posture between the power supply primary coil 21 and the power supply secondary coil 22 set to the desired posture.

The wireless power transfer is performed, with the projecting surface formed on a part of the power supply secondary coil 22 containing the first secondary coil wire and the second secondary coil respectively wound along the intersecting first virtual surface and second virtual surface directed to the power supply primary coil 21 provided at the object support structure 40. Therefore, the wireless power transfer can be performed, with the relative posture between the power supply primary coil 21 and the power supply secondary coil 22 set to the desired posture.

The signal is output in a case where the wireless power transfer cannot be performed from when the vehicle 10 is stored until a predetermined period of time has elapsed. Therefore, it is possible to notify that the power supply secondary coil 22 is forgotten to be placed or that the power supply secondary coil 22 has been placed at an inappropriate place.

The present disclosure is not limited to the above-mentioned embodiments, and can be variously changed in a range not deviating from the gist of the disclosure.

Although an exemplary case where the object is the vehicle has been described, the present disclosure is not limited to this exemplary case.

For example, the object is electric apparatuses, vehicles, moving bodies, and ships or the like.

When the object is a vehicle, for example, the storage space is a parking space, and the object support structure is a pallet.

When the object is a ship, for example, the storage space is a berth, and the object support structure is a shipway.

When the object is an electric apparatus, for example, the storage space is a wet place, and the object support structure is a stand for the electric apparatus.

A plate made of a material that does not affect a magnetic field may cover the void Q.

Although an exemplary case where a moving mechanism of a parking device is configured to be an elevator parking device has been described, the present disclosure is not limited to this exemplary case. Examples of the moving mechanism may include a circulation mechanism such as a box circulation parking device, a horizontal circulation parking device, a merry-go-round parking device, an elevator sliding parking device, a plane reciprocating parking device, a transporting storage parking device, and a two-stage or multiple-stage parking device.

INDUSTRIAL APPLICABILITY

According to some aspects of the present disclosure, it is possible to perform easily available power supply with a small energy loss using a simple structure.

REFERENCE SIGNS LIST

A first virtual surface
B second virtual surface
S running surface
R storage space
Q void
K contour
F1 primary outer shape
F2 secondary outer shape
10 vehicle
11 vehicle main body
12 power receiving circuit
13 power supply plug receiver
20 charging cable
21 power supply primary coil
22 power supply secondary coil
22a first power supply secondary coil
22b second power supply secondary coil
23 electric circuit
24 power supply plug
25 converter unit
30 drive circuit
40 object support structure
41 object support structure main body
42 mark
43 depression
100 wireless power transfer system
110 power supply primary coil
111 primary coil wire
112 primary coil case
120 power supply secondary coil
121 secondary coil wire
122 secondary coil case
130 intermediate case
131 intermediate coil wire

The invention claimed is:

1. A wireless power transfer system that performs wireless power transfer, the wireless power transfer system comprising:
a power supply primary coil capable of performing the wireless power transfer; and
a power supply secondary coil capable of performing the wireless power transfer between the power supply primary coil and the power supply secondary coil, wherein
the power supply secondary coil contains a secondary coil wire for the wireless power transfer and forms a secondary outer shape having a projecting surface on at least a part of the secondary outer shape,
the power supply primary coil and the power supply secondary coil are capable of performing the wireless power transfer, with the projecting surface of the secondary outer shape directed to the power supply primary coil,
the secondary outer shape has a projecting curved surface on at least a part of the secondary outer shape,
the power supply primary coil and the power supply secondary coil are capable of performing the wireless power transfer, with the projecting curved surface of the secondary outer shape directed to the power supply primary coil,
a gravity center point of the power supply secondary coil is offset from a curvature center of the projecting curved surface and located on a side of the projecting curved surface,
the power supply primary coil contains a primary coil wire for the wireless power transfer and forms a primary outer shape having a depression in at least a part of the primary outer shape,
the power supply primary coil and the power supply secondary coil are capable of performing the wireless power transfer, with the projecting surface of the secondary outer shape fit into the depression of the primary outer shape,
the depression includes a first depression and a second depression located at a center of the first depression and smaller than the first depression, and
the power supply primary coil and the power supply secondary coil are capable of performing the wireless power transfer, with the projecting surface of the secondary outer shape fit into the second depression of the primary outer shape.

2. The wireless power transfer system according to claim 1, comprising an intermediate case that supports the power supply secondary coil, wherein
the secondary outer shape has a projecting curved surface with a constant radius of curvature on at least a part of the secondary outer shape,
the intermediate case has an inner wall forming a recessed curved surface with a constant radius of curvature that covers the projecting curved surface of the secondary outer shape, and
the power supply primary coil and the power supply secondary coil are capable of performing the wireless power transfer, with the projecting curved surface of the secondary outer shape swingable guided by the recessed curved surface of the intermediate case.

3. The wireless power transfer system according to claim 2, wherein
the intermediate case contains an intermediate coil wire, and
the power supply primary coil and the power supply secondary coil are capable of performing the wireless power transfer relayed by the intermediate coil wire.

4. The wireless power transfer system according to claim 3, wherein
the power supply secondary coil contains a first secondary coil wire and a second secondary coil wire that are a pair of secondary coil wires,
the first secondary coil wire is wound along a first virtual surface,
the second secondary coil wire is wound along a second virtual surface, and
the first virtual surface and the second virtual surface intersect.

5. The wireless power transfer system according to claim 1, comprising an intermediate case that supports the power supply secondary coil, wherein
the secondary outer shape has a projecting curved surface with a constant radius of curvature on at least a part of the secondary outer shape,
the intermediate case has an inner wall forming a recessed curved surface with a constant radius of curvature that covers the projecting curved surface of the secondary outer shape,
the intermediate case contains an intermediate coil wire, and
the power supply primary coil and the power supply secondary coil are capable of performing the wireless power transfer relayed by the intermediate coil wire, with the projecting curved surface of the secondary outer shape swingable guided by the recessed curved surface of the intermediate case.

6. The wireless power transfer system according to claim 1, wherein
the power supply secondary coil contains a first secondary coil wire and a second secondary coil wire that are a pair of secondary coil wires,
the first secondary coil wire is wound along a first virtual surface,
the second secondary coil wire is wound along a second virtual surface, and
the first virtual surface and the second virtual surface intersect.

7. A wireless power transfer system that performs wireless power transfer, the wireless power transfer system comprising:
a power supply primary coil capable of performing the wireless power transfer;
a power supply secondary coil capable of performing the wireless power transfer between the power supply primary coil and the power supply secondary coil; and
an intermediate case that supports the power supply secondary coil, wherein
the power supply secondary coil contains a secondary coil wire for the wireless power transfer and forms a secondary outer shape having a projecting surface on at least a part of the secondary outer shape,
the power supply primary coil and the power supply secondary coil are capable of performing the wireless power transfer, with the projecting surface of the secondary outer shape directed to the power supply primary coil,
the secondary outer shape has a spherical curved surface with a constant radius of curvature on at least a part of the secondary outer shape,
the intermediate case has an inner wall forming a recessed curved surface with a constant radius of curvature that covers the spherical curved surface of the secondary outer shape, and
the power supply primary coil and the power supply secondary coil are capable of performing the wireless power transfer, with the spherical curved surface of the secondary outer shape swingable guided by the recessed curved surface of the intermediate case.

8. An object power supply device capable of supplying electric power to an object in which a power receiving circuit is provided, the object power supply device comprising:
an object support structure capable of supporting the object;
a power supply primary coil provided at the object support structure and capable of performing wireless power transfer to a power supply secondary coil; and
a charging cable having an electric circuit that is electrically connectable to the power receiving circuit of the object, and the power supply secondary coil electrically connected to the electric circuit and capable of receiving the wireless power transfer from the power supply primary coil, wherein
the power supply secondary coil contains a secondary coil wire for the wireless power transfer and forms a secondary outer shape having a projecting surface on at least a part of the secondary outer shape,
the power supply primary coil and the power supply secondary coil are capable of performing the wireless power transfer, with the projecting surface of the secondary outer shape directed to the power supply primary coil,
the object support structure forms a primary outer shape having a depression in at least a part of a position where the power supply primary coil is provided,
the power supply primary coil and the power supply secondary coil are capable of performing the wireless power transfer, with the projecting surface of the secondary outer shape fit into the depression of the primary outer shape,
the object support structure forms the primary outer shape having the depression in at least a part of the position where the power supply primary coil is provided,
the depression includes a first depression and a second depression located at a center of the first depression and smaller than the first depression, and
the power supply primary coil and the power supply secondary coil are capable of performing the wireless power transfer, with the projecting surface of the secondary outer shape fit into the second depression of the primary outer shape.

* * * * *